(12) United States Patent
Koren et al.

(10) Patent No.: US 9,436,588 B2
(45) Date of Patent: Sep. 6, 2016

(54) EFFICIENT METHOD DATA RECORDING

(71) Applicant: Identify Software Ltd. (IL), Petach Tikva (IL)

(72) Inventors: Eyal Koren, Dafna (IL); Asaf Dafner, Gedera (IL); Shiri Semo Judelman, Kfar-Saba (IL)

(73) Assignee: Identify Software Ltd. (IL), Houston, TX (US)

( * ) Notice: Subject to any disclaimer, the term of this patent is extended or adjusted under 35 U.S.C. 154(b) by 0 days.

(21) Appl. No.: 13/630,784

(22) Filed: Sep. 28, 2012

(65) Prior Publication Data

US 2014/0096114 A1 Apr. 3, 2014

(51) Int. Cl.
*G06F 9/44* (2006.01)
*G06F 11/36* (2006.01)
*G06F 11/34* (2006.01)

(52) U.S. Cl.
CPC ............. *G06F 11/3688* (2013.01); *G06F 8/70* (2013.01); *G06F 9/4425* (2013.01); *G06F 11/3466* (2013.01); *G06F 11/3636* (2013.01)

(58) Field of Classification Search
None
See application file for complete search history.

(56) References Cited

U.S. PATENT DOCUMENTS

| | | | | |
|---|---|---|---|---|
| 3,688,278 A * | 8/1972 | Sauvan | ................. | G06F 9/4425 712/E9.082 |
| 5,732,272 A * | 3/1998 | Gochee | ................. | G06F 9/4425 712/E9.082 |
| 5,822,586 A * | 10/1998 | Strutt | .................... | G06F 9/4425 712/E9.082 |
| 6,185,597 B1 * | 2/2001 | Paterson | ................ | G06F 9/4425 712/E9.082 |
| 6,202,199 B1 * | 3/2001 | Wygodny | ........... | G06F 11/3636 702/183 |
| 6,282,701 B1 * | 8/2001 | Wygodny | ........... | G06F 11/3466 702/183 |
| 6,293,712 B1 * | 9/2001 | Coutant | ................ | G06F 9/4425 712/228 |
| 6,338,159 B1 * | 1/2002 | Alexander et al. | ........... | 717/128 |
| 6,349,406 B1 * | 2/2002 | Levine | ................ | G06F 11/3466 702/179 |
| 6,513,155 B1 | 1/2003 | Alexander et al. | | |
| 6,751,789 B1 * | 6/2004 | Berry | .................. | G06F 11/3466 714/35 |
| 6,823,460 B1 * | 11/2004 | Hollander | ............. | G06F 9/4425 710/260 |

(Continued)

FOREIGN PATENT DOCUMENTS

WO 00/07100 A1 2/2002

OTHER PUBLICATIONS

University of Maryland, "Understanding the Stack," Jul. 23, 2012, downloaded from the Internet on Nov. 14, 2014 from <url>:http://web.archive.org/web/20120723030110/http://www.cs.umd.edu/class/sum2003/cmsc311/Notes/Mips/stack.html, pp. 1-9.*

(Continued)

*Primary Examiner* — Thuy Dao
*Assistant Examiner* — Stephen Berman
(74) *Attorney, Agent, or Firm* — Brake Hughes Bellermann LLP

(57) ABSTRACT

According to one general aspect, a method may include monitoring the execution or at least a portion of a software application. The method may also include collecting subroutine call information regarding a plurality of subroutine calls included by the portion of the software application, wherein one or more of the subroutine calls is selected for detailed data recording. The method may further include pruning, as the software application is being executed, a subroutine call tree to include only the subroutine calls selected for detailed data recording and one or more parent subroutine calls of each subroutine calls selected for detailed data recording.

18 Claims, 22 Drawing Sheets

700

702 Monitoring the execution of at least a portion of a software application

↓

704 Collecting subroutine call information regarding a plurality of subroutine calls

↓

706 Pruning, as the software application is being executed, a subroutine call tree to include only the subroutine calls selected for detailed data recording and one or more parent subroutine calls

(56) References Cited

U.S. PATENT DOCUMENTS

| | | | |
|---|---|---|---|
| 6,857,120 B1* | 2/2005 | Arnold | G06F 9/4425 712/E9.082 |
| 7,058,928 B2 | 6/2006 | Wygodny et al. | |
| 7,131,115 B2* | 10/2006 | Hundt et al. | 717/130 |
| 7,194,664 B1* | 3/2007 | Fung | G06F 11/3636 714/32 |
| 7,310,777 B2 | 12/2007 | Cirne | |
| 7,739,689 B1* | 6/2010 | Spertus | G06F 9/4425 717/130 |
| 8,312,435 B2 | 11/2012 | Wygodny et al. | |
| 8,386,852 B2* | 2/2013 | Cohen | G06F 11/3688 714/33 |
| 8,464,221 B2* | 6/2013 | Zheng et al. | 717/124 |
| 8,782,614 B2 | 7/2014 | Basak et al. | |
| 9,311,220 B1* | 4/2016 | Ha | G06F 11/3636 |
| 2003/0088854 A1* | 5/2003 | Wygodny | G06F 11/3636 717/130 |
| 2003/0159133 A1 | 8/2003 | Ferri et al. | |
| 2004/0031020 A1* | 2/2004 | Berry | G06F 11/3409 717/130 |
| 2004/0128658 A1 | 7/2004 | Lueh et al. | |
| 2004/0148594 A1* | 7/2004 | Williams | G06F 9/4425 717/158 |
| 2004/0153837 A1* | 8/2004 | Preston | G06F 11/3688 714/39 |
| 2005/0171731 A1* | 8/2005 | Chen | G06F 9/4425 702/176 |
| 2005/0177752 A1* | 8/2005 | Hollander | G06F 9/4425 726/5 |
| 2005/0262493 A1 | 11/2005 | Schmidt et al. | |
| 2006/0236309 A1* | 10/2006 | George | 717/133 |
| 2006/0242627 A1 | 10/2006 | Wygodny et al. | |
| 2007/0061626 A1* | 3/2007 | Nelson | G06F 11/3688 714/38.14 |
| 2008/0244531 A1* | 10/2008 | Schmelter | G06F 11/3636 717/128 |
| 2008/0307441 A1* | 12/2008 | Kuiper | G06F 9/4425 719/321 |
| 2009/0055802 A1* | 2/2009 | Crosby | G06F 11/3466 717/125 |
| 2010/0017789 A1* | 1/2010 | Dewitt, Jr. | G06F 11/3466 717/126 |
| 2010/0064279 A1* | 3/2010 | Stewart | 717/122 |
| 2010/0095278 A1* | 4/2010 | Nageshappa | G06F 11/3636 717/128 |
| 2010/0146489 A1* | 6/2010 | Ortiz | G06F 11/3688 717/128 |
| 2010/0174732 A1 | 7/2010 | Levy et al. | |
| 2010/0235815 A1* | 9/2010 | Maybee et al. | 717/125 |
| 2010/0318852 A1* | 12/2010 | Zheng et al. | 714/37 |
| 2011/0029821 A1* | 2/2011 | Chow | G06F 11/3476 714/45 |
| 2011/0145800 A1* | 6/2011 | Rao et al. | 717/133 |
| 2011/0214108 A1* | 9/2011 | Grunberg | G06F 11/3466 717/128 |
| 2011/0258604 A1* | 10/2011 | Drukman et al. | 717/125 |
| 2012/0079108 A1* | 3/2012 | Findeisen | G06F 11/3419 709/224 |
| 2013/0019227 A1 | 1/2013 | Chiu | |
| 2013/0318505 A1* | 11/2013 | Rhee | G06F 11/3636 717/128 |

OTHER PUBLICATIONS

Pauw et al., "Visualizing the Execution of Java Programs," 2002, Software Visualization, Volume 2269 of the series Lecture Notes in Computer Science, pp. 151-162.*

Taniguchi et al., "Extracting sequence diagram from execution trace of Java program," 2005, Eighth International Workshop on Principles of Software Evolution, pp. 148-151.*

Feng et al., "Anomaly detection using call stack information," 2003, 2003 Symposium on Security and Privacy, pp. 62-75.*

Tsai et al., "A noninterference monitoring and replay mechanism for real-time software testing and debugging," 2002, IEEE Transactions on Software Engineering, vol. 16, Issue 8, pp. 897-916.*

McMaster et al., "Call-Stack Coverage for GUI Test Suite Reduction," 2008, IEEE Transactions on Software Engineering, vol. 34, Issue 1, pp. 99-115.* van Hoorn et al., "Continuous Monitoring of Software Services: Design and Application of the Kieker Framework," 2009, Technical Reports by Department of Computer Science, TR-0921, Department of Computer Science, Kiel University, Germany, pp. 1-26.*

McGavin et al., "Visualisations of execution traces (VET): an interactive plugin-based visualisation tool," 2006, AUIC '06 Proceedings of the 7th Australasian User interface conference—vol. 50, pp. 153-160.*

Knupfer et al., "The Vampir Performance Analysis Tool-Set," 2008, Proceedings of the 2nd International Workshop on Parallel Tools for High Performance Computing, pp. 139-155.*

Harkema et al., "Performance monitoring of java applications," 2002, WOSP '02 Proceedings of the 3rd international workshop on Software and performance, pp. 114-127.*

Jerding et al., "Visualizing interactions in program executions," 1997, ICSE '97 Proceedings of the 19th international conference on Software engineering, pp. 360-370.*

Miransky et al., "SIFT: a scalable iterative-unfolding technique for filtering execution traces," 2008, Proceedings of the 2008 conference of the center for advanced studies on collaborative research: meeting of minds, Article No. 21, pp. 1-15.*

Cornelissen et al., "Understanding Execution Traces Using Massive Sequence and Circular Bundle Views," 2007, 15th IEEE International Conference on Program Comprehension (ICPC '07), pp. 49-58.*

"Call Graphs Pro 3.8 Documentation AppDynamics Documentation", available online at <https://docs.appdynamics.com/display/PRO14S/Call+Graphs#CallGraphsPackagesandNamespaces-excludedfromthecallgraph>, Jan. 4, 2016, pp. 1-5.

"AppDynamics Strong Business Momentum Continued in Fiscal Year 2015—Annual Bookings Double to over $150 Million", available online at <https://www.appdynamics.com/pressrelease/appdynamicsstrongbusinessmomentumcontinuedinfiscalyear-2015/>, Jan. 4, 2016, pp. 1-12.

"Kowall et al., "Magic Quadrant for Application Performance Monitoring", available online at <http://www.gartner.com/technology/reprints.do?id=1-23QQOPU&ct=141029&st=sb>", Oct. 28, 2014, pp. 1-13.

Non-Final Office Action received for U.S Appl. No. 15/003,280, mailed on Mar. 11, 2016, 18 pages.

* cited by examiner

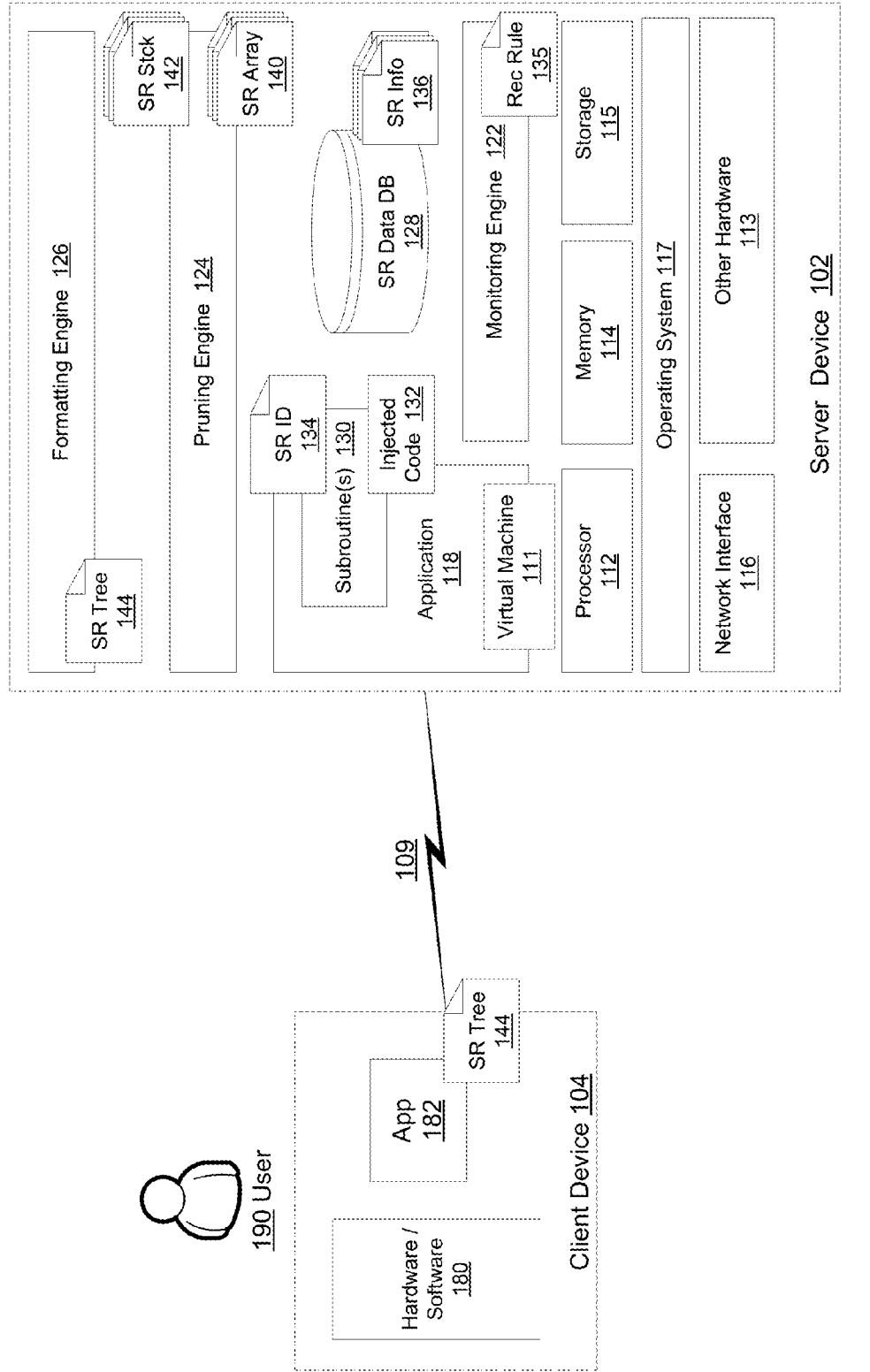

FIG. 3a 300

```
public String doSomething(String s)
{
    ...
    throw new IllegalStateException();
    ...
    return "First";
    ...
    return "Second";
}
```

FIG. 3b 301

```
    public String doSomething(String s)
    {
302     Recorder.recordEntry();
        ...
        Throwable t = new IllegalStateException();
304     Recorder.recordThrown(35, t, s);
        throw t;
        ...
        String s1 = "First";
306     Recorder.recordReturn(35, s1, s);
        return s1;
        ...
        String s2 = "Second";
308     Recorder.recordReturn(35, s2, s);
        return s2;
    }
```

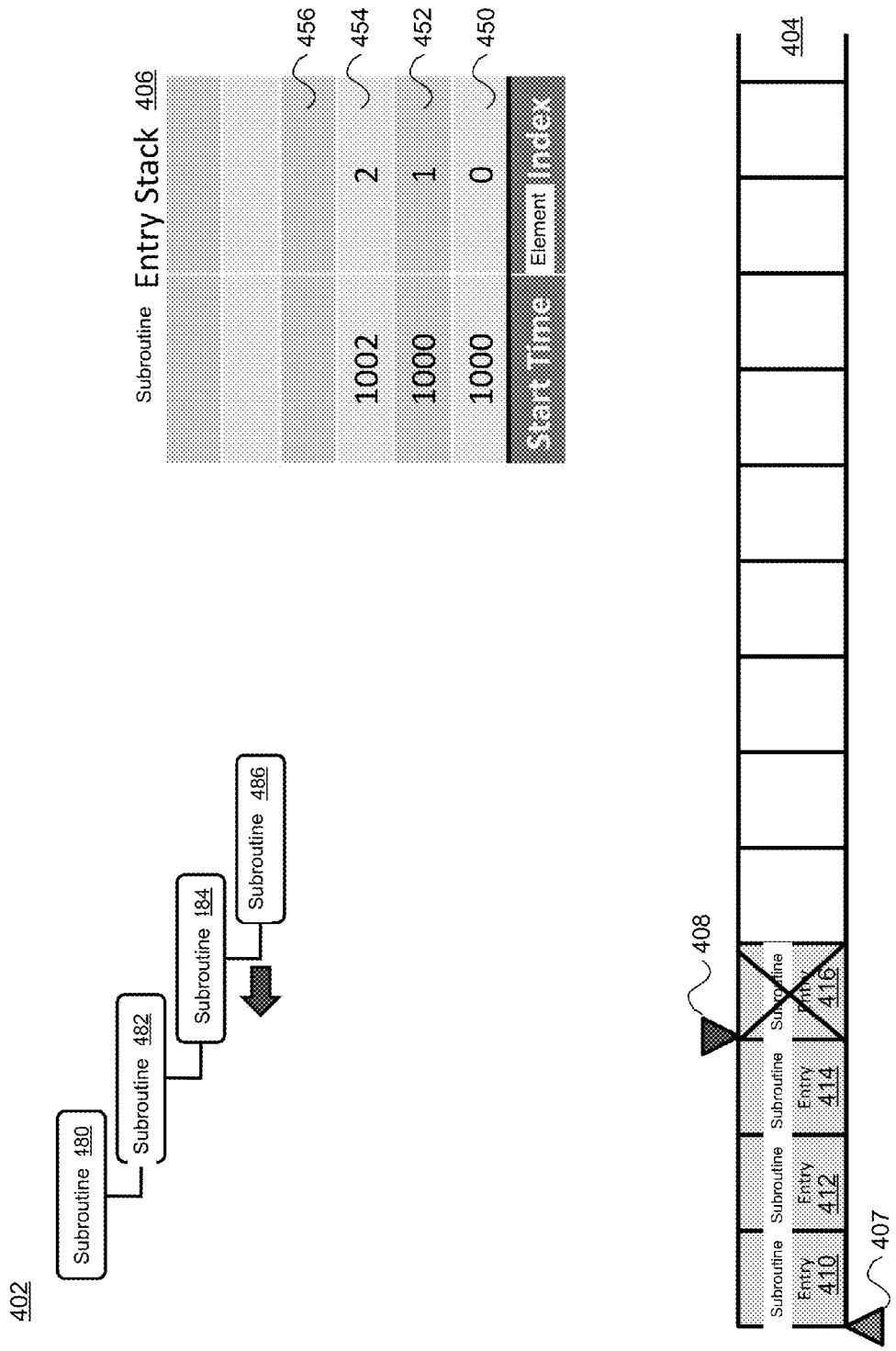

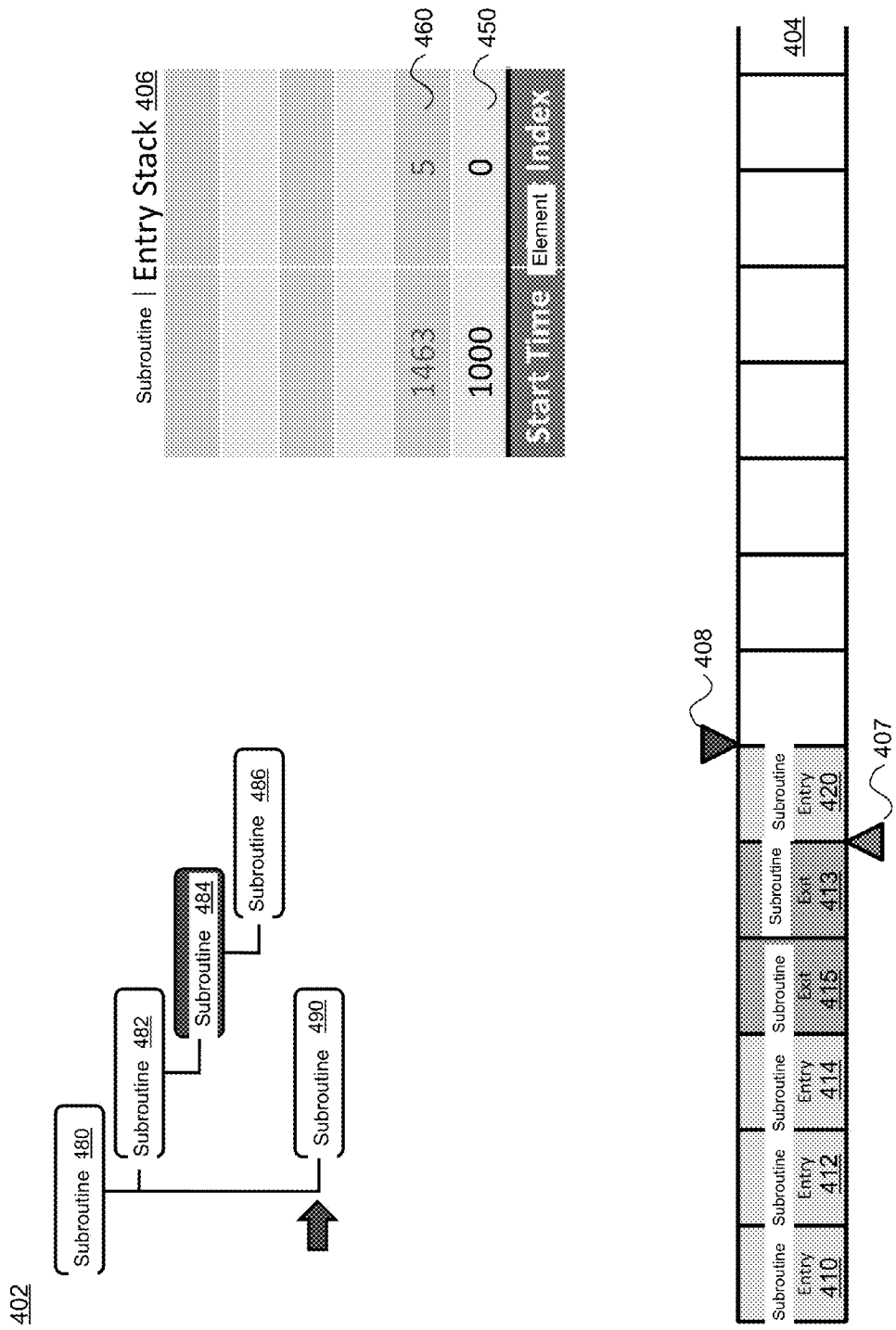

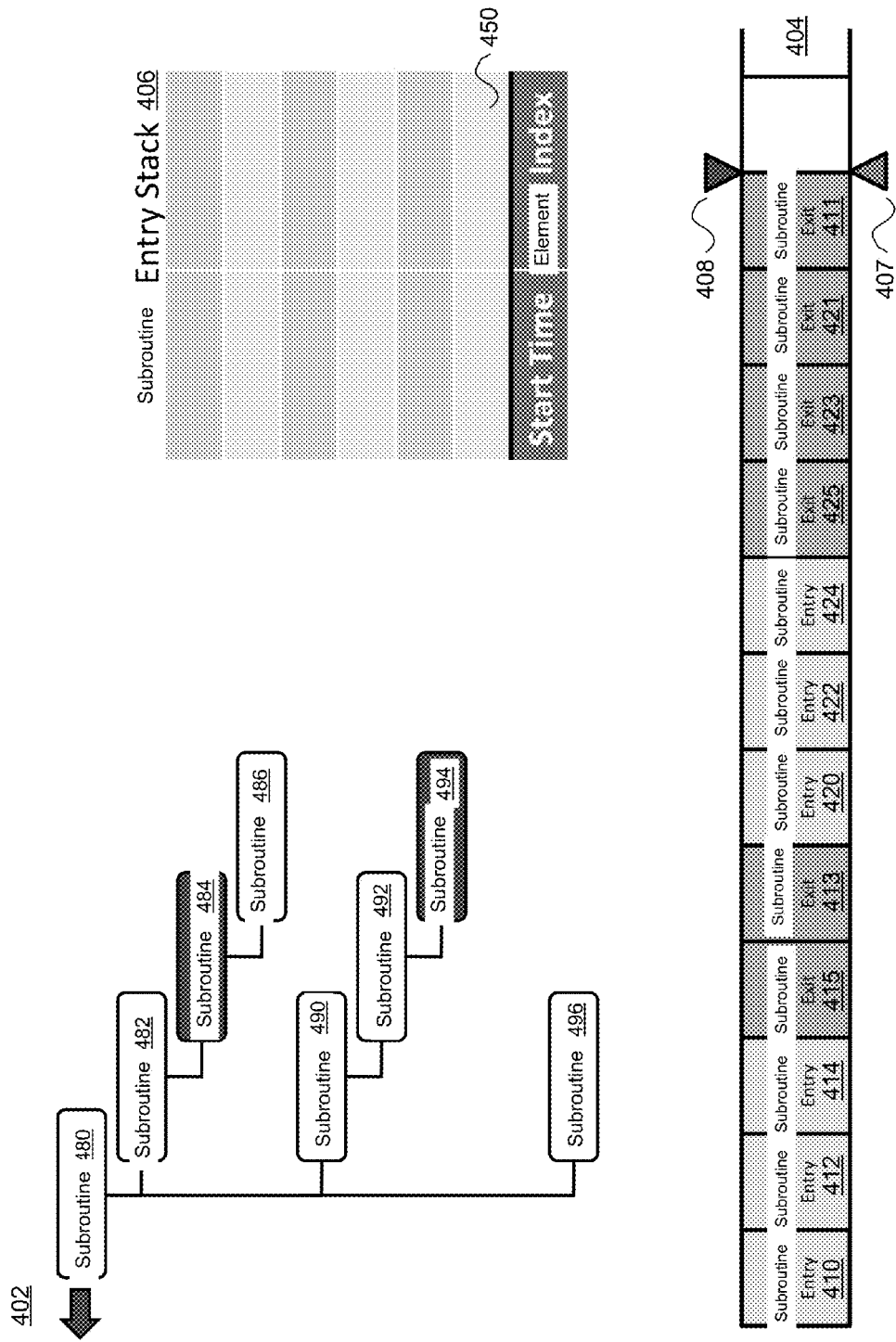

FIG. 7
700
702 Monitoring the execution of at least a portion of a software application
704 Collecting subroutine call information regarding a plurality of subroutine calls
706 Pruning, as the software application is being executed, a subroutine call tree to include only the subroutine calls selected for detailed data recording and one or more parent subroutine calls

EFFICIENT METHOD DATA RECORDING

TECHNICAL FIELD

This description relates to software analysis, and more specifically to performance and function monitoring of software applications.

BACKGROUND

Generally software application diagnostics tools for production or operations environments provide initial identification of problems. Often when identified, problems are escalated to an application development team for further analysis and in order to be fixed. Typically, when a problem is escalated to developers it may be very helpful to have to be provided focused and detailed recorded information that is specifically relevant to the problem. Such information may shorten the time is takes to find and fix the problem's root cause. Often such details include: the amount of time spent in a given method or subroutine, the arguments received by the method or subroutine, the value or data, if any, returned from the method of subroutine, any exceptions or errors thrown or generated by the method or subroutine, any method or subroutine specific data (e.g. internal variables, global variables, etc.), or application specific information (e.g., Structured Query Language (SQL) queries related to a specific invocation of a database query, hypertext transport protocol (HTPP) header information for networking subroutines, etc.), etc.

Often in order to provide detailed data as described above, data must be collected during the method or subroutine execution on the user-thread, thus causing considerable overhead on the server or executing computer during subroutine execution. Generally, it is desirable for any processes running on server's request-handling threads to be as efficient as possible. This is often highly important in production environments, where latency increase is a real problem. Specifically, collection of method data (e.g. method arguments, return types, thrown exceptions, entry/exit times, etc.) may involve invocation of expensive procedures.

Further, it is often necessary to alter the source code of a subroutine or method prior to compilation in order to allow for collection of the data described above. In addition, due to the desire to reduce latency or, more generally the use of system resources (e.g., processor cycles, memory usage, network bandwidth, etc.) any processing of the collected subroutine data is often done after the execution of the subroutine or software application as a whole.

SUMMARY

According to one general aspect, a method may include monitoring the execution or at least a portion of a software application. The method may also include collecting subroutine call information regarding a plurality of subroutine calls included by the portion of the software application, wherein one or more of the subroutine calls is selected for detailed data recording. The method may further include pruning, as the software application is being executed, a subroutine call tree to include only the subroutine calls selected for detailed data recording and one or more parent subroutine calls of each subroutine calls selected for detailed data recording.

According to another general aspect, an apparatus may include a processor and a memory. The processor may be configured to execute a software application, monitor the execution or at least a portion of the software application, and collect subroutine call information regarding a plurality of subroutine calls included by the portion of the software application, wherein one or more of the subroutine calls is selected for detailed data recording. The memory may be configured to store the subroutine call information that was collected by the processor. The processor may be further configured to prune, as the software application is being executed, a subroutine call tree to include only the subroutine calls selected for detailed data recording and one or more parent subroutine calls of each subroutine calls selected for detailed data recording.

According to another general aspect, a computer program product for aiding software analysis may be tangibly and non-transitorily embodied on a computer-readable medium. The computer program product may include executable code that, when executed, is configured to cause an apparatus to monitor the execution or at least a portion of a software application, collect subroutine call information regarding a plurality of subroutine calls included by the portion of the software application, wherein one or more of the subroutine calls is selected for detailed data recording, and prune, as the software application is being executed, a subroutine call tree to include only the subroutine calls selected for detailed data recording and one or more parent subroutine calls of each subroutine calls selected for detailed data recording.

The details of one or more implementations are set forth in the accompanying drawings and the description below. Other features will be apparent from the description and drawings, and from the claims.

A system and/or method for software analysis, substantially as shown in and/or described in connection with at least one of the figures, as set forth more completely in the claims.

BRIEF DESCRIPTION OF THE DRAWINGS

FIG. 1 is a block diagram of an example embodiment of a system in accordance with the disclosed subject matter.

FIG. 3a is a diagram of an example embodiment of source code used by a system in accordance with the disclosed subject matter.

FIG. 3b is a diagram of an example embodiment of source code used by a system in accordance with the disclosed subject matter.

FIG. 4e is a diagram of example embodiments of data structures used by a system in accordance with the disclosed subject matter.

FIG. 4h is a diagram of example embodiments of data structures used by a system in accordance with the disclosed subject matter.

FIG. 4l is a diagram of example embodiments of data structures used by a system in accordance with the disclosed subject matter.

FIG. 4o is a diagram of example embodiments of data structures used by a system in accordance with the disclosed subject matter.

FIG. 7 is a flowchart of an example embodiment of a technique in accordance with the disclosed subject matter.

Like reference symbols in the various drawings indicate like elements.

DETAILED DESCRIPTION

Figure 2A:
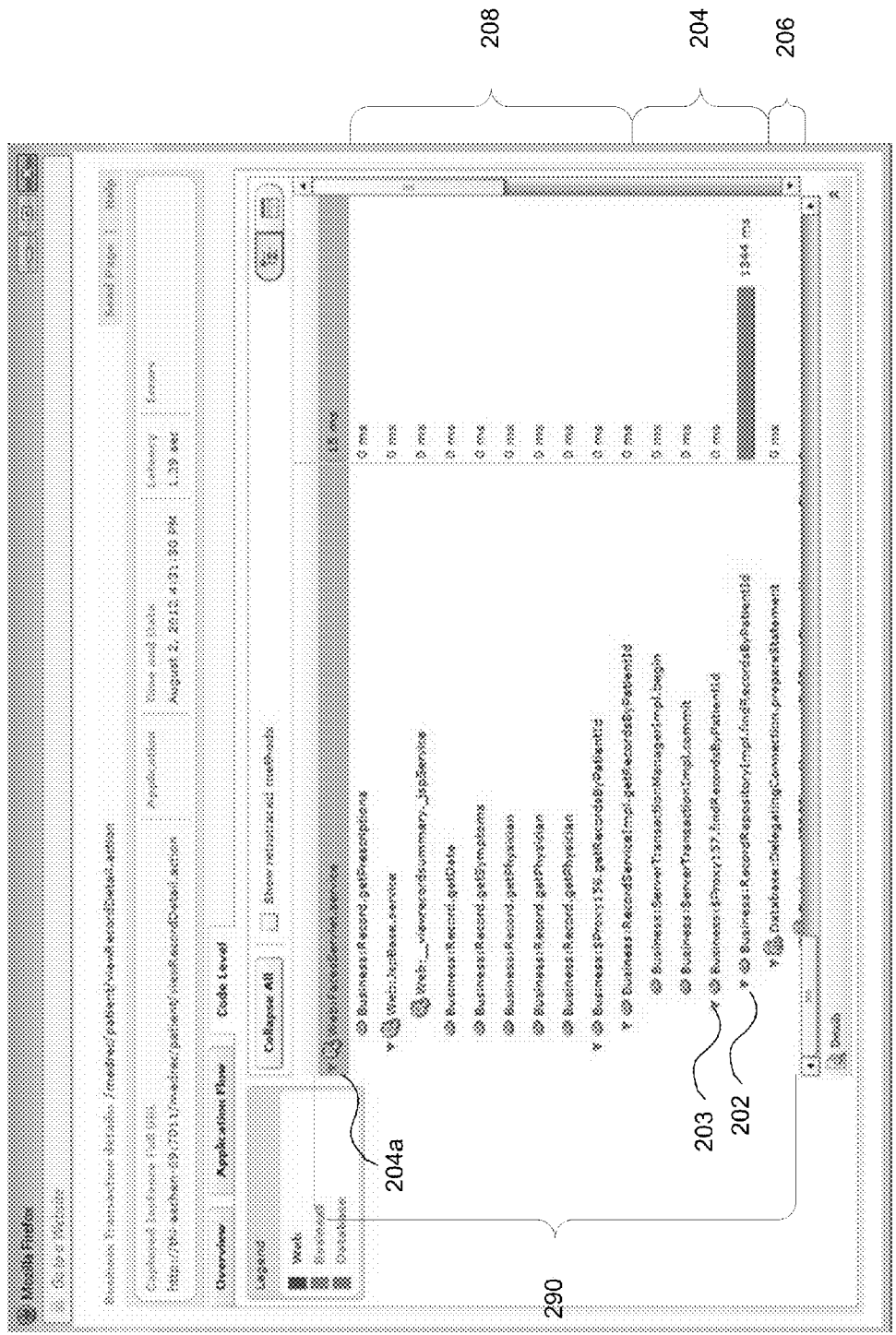
FIG. 2a is a diagram of an example embodiment of a user interface produced by a system in accordance with the disclosed subject matter.

FIG. 1 is a block diagram of an example embodiment of a system 100 in accordance with the disclosed subject matter. In various embodiments, the system may include a server computing device 102. In some embodiments, the system 100 may also include a client computing device 104 that is in communication with the server device 102.

In various embodiments, the server device 102 may include a computing device, such as, for example, as laptops, desktops, workstations, personal digital assistants, servers, blade servers, mainframes, and other appropriate computers, etc. or a virtual machine or virtual computing device thereof. In various embodiments, the server device 102 may be used by a user (not shown). In various embodiments, the server device 102 may include a processor 112 configured to execute one or more machine executable instructions or pieces of software, firmware, or a combination thereof. The server device 102 may include, in some embodiments, a memory 114 configured to store one or more pieces of data, either temporarily, permanently, semi-permanently, or a combination thereof. Further, the memory 114 may include volatile memory, non-volatile memory or a combination thereof. In various embodiments, the server device 102 may include a storage medium 115 configured to store data in a semi-permanent or substantially permanent form. In various embodiments, the storage medium 115 may be included by the memory 114.

In various embodiments, the server device 102 may include one or more network interfaces 116 configured to allow the placement device 102 to be part of and communicate via a communications network 109. Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to: IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

In various embodiments, the server device 102 may include one or more other hardware components 113 (e.g., a display or monitor, a keyboard, a mouse, a camera, a fingerprint reader, a video processor, etc.). It is understood that the above are merely a few illustrative examples to which the disclosed subject matter is not limited.

In various embodiments, the server device 102 may include an operating system (OS) 117 configured to provide one or more services to an application 118 and manage or act as an intermediary between the application 118 and the various hardware components (e.g., the processor 112, a network interface 116, etc.) of the placement device 102. In such an embodiment, the server device 102 may include one or more native applications, which may be installed locally (e.g., within the storage medium 115, etc.) and configured to be executed directly by the processor 112 and directly interact with the OS 117. In such an embodiment, the native applications may include pre-compiled machine executable code. In some embodiments, the native applications may include a script interpreter (e.g., C shell (csh), AppleScript, AutoHotkey, etc.) or a virtual execution machine (VM) 111 (e.g., the Java Virtual Machine, the Microsoft Common Language Runtime, etc.) that are configured to translate source or object code into executable code which is then executed by the processor 112.

In one embodiment, the OS 117 may allow the application 118 access to various system resources (e.g., access to the storage medium 116, access to a camera, access to a location sensor, draw a user interface (UI) on a display/monitor, etc.) to perform various application functions (e.g., contact a web site, take a picture, read/write a file, etc.).

In various embodiments, the application 118 may include one or more subroutines 130. In this context, a "subroutine" includes an independent module or portion of software programming instructions. In many embodiments, a subroutine 130 performs a specific task or function and may be relatively independent from the application 118 as a whole. In various embodiments, what is referred to as a "subroutine" may also be referred to as a "function", "method", "subprogram", "procedure", or "routine" by those skilled in the art.

Generally, a subroutine receives as input various variables or data elements from a calling portion of the application 118, which may be another subroutine. In this context, such input data elements are referred to as "arguments" or "parameters". Often, but not always, a subroutine returns or provides as output one or more data elements. In this context, such output data elements are referred to as "return value(s)". In some embodiments, a subroutine 130 may include variables or data elements that are considered local or are generally not accessible by another portion of the application 118.

In this context, a subroutine is "called" when another portion of the application 118 instructs the processor 112 or other executing component (e.g., virtual machine 111, etc.) to "jump" to the subroutine 130 or otherwise begin to execute instructions included by the subroutine. In such an embodiment, each separate call may include or provide to the subroutine different arguments and result in different return values. In various embodiments, multiple calls to the same subroutine 130 may be active or executed substantially simultaneously (e.g., in the case of multi-threading, multi-tasking, pipelining, etc.).

In this context, a subroutine 130 is "entered" when the subroutine 130 is first called and the arguments are provided to the subroutine 130. Conversely, in this context, a subroutine 130 is "exited" when the instructions of the subroutine finish executing. When a subroutine exits is often when a return value is provided back to the calling portion of the application 118. In some embodiments, a return value may not be provided directly back to the calling portion of the application 118, but may be output to another portion of the application 118 or a data structure (e.g., a database (not shown), an array stored in memory 114 and used by the application 118, etc.).

In various embodiments, the server device 102 may include a monitoring engine 122 configured to monitor the execution or at least a portion of application 118. In various embodiments, the selection of which portions of the application 118 to monitor may be predefined (e.g., via list provided by a user, etc.). In another embodiment, the selection of which portions of the application 118 to monitor may be dynamically selected based upon a set of predefined rules or criteria (e.g., an error of the application 118 during the current or prior execution, a number of users 190 accessing the application 118, system resource of a portion of the application 118, etc.). In some embodiments, the monitoring engine 122 may be configured to monitor the entire application 118. It is understood that the above are merely a few illustrative examples to which the disclosed subject matter is not limited.

In various embodiments, the monitoring engine 122 may be configured to monitor or provide data that will eventually be turned into a subroutine call tree 144 or a data structure that includes information regarding various subroutines 134 or portions of the application 118's execution for further analysis by a user or software developer 190. In some embodiments, this subroutine call tree 144 or a data structure may be transmitted or provided to a client computing device 104 that is configured to be controlled by a user 190.

In various embodiments, the system 100 may include a client computing device 104. In various embodiments, the client device 104 may include a computing device, such as, for example, as laptops, desktops, workstations, personal digital assistants, and other appropriate computers, etc. or a virtual machine or virtual computing device thereof. In various embodiments, the client device 104 may include hardware and/or software similar to or analogous to that described in reference to the server 102 (e.g., processor 112, memory 114, OS 117, etc.). In various embodiments, the client device 104 may include an application 182 (e.g., software analysis tool, software development integrated design environment, etc.) configured to make use of the subroutine call tree 144. In such an embodiment, the user 190 may review the subroutine call tree 144 and, based on the data included by the subroutine call tree 144, make changes to the application 118 (or the source code that results in the application 118). It is understood that the above is merely one illustrative example to which the disclosed subject matter is not limited.

FIG. 2a is a diagram of an example embodiment of a user interface (UI) 200 produced by a system in accordance with the disclosed subject matter. In the illustrated embodiment, a full or un-pruned subroutine call tree 290 is (partially) shown. In the illustrated embodiment, hierarchical representation of a plurality of subroutines is shown, which each calling subroutine directly above (in a hierarchical context) the subroutines that the calling subroutine called. For example, subroutine call 203 calls subroutine 202, etc. In the illustrated embodiment, the UI 200 shows the names of the plurality of subroutines in a first column and the amount of time the respective subroutines took to execute (the time between entry and exit) in a second column.

In the illustrated embodiment, the subroutine call 202 executes for 1344 milliseconds (ms). The other subroutines execute for 0 ms or less than 1 ms (depending on the granularity of the monitoring tool). As such, a software developer may not be interested in the information included for the 0 ms execution subroutines (subroutines 206 and 208), but may be very interested in subroutine call 202 and any subroutines that called (either directly or indirectly) the subroutine call 202 (subroutine calls 204 and 204a). In such an embodiment, the information regarding subroutine calls 206 and 208 may be uninteresting to the software developer and their monitoring may reduce the performance of the computing device that executed them.

Figure 2B:
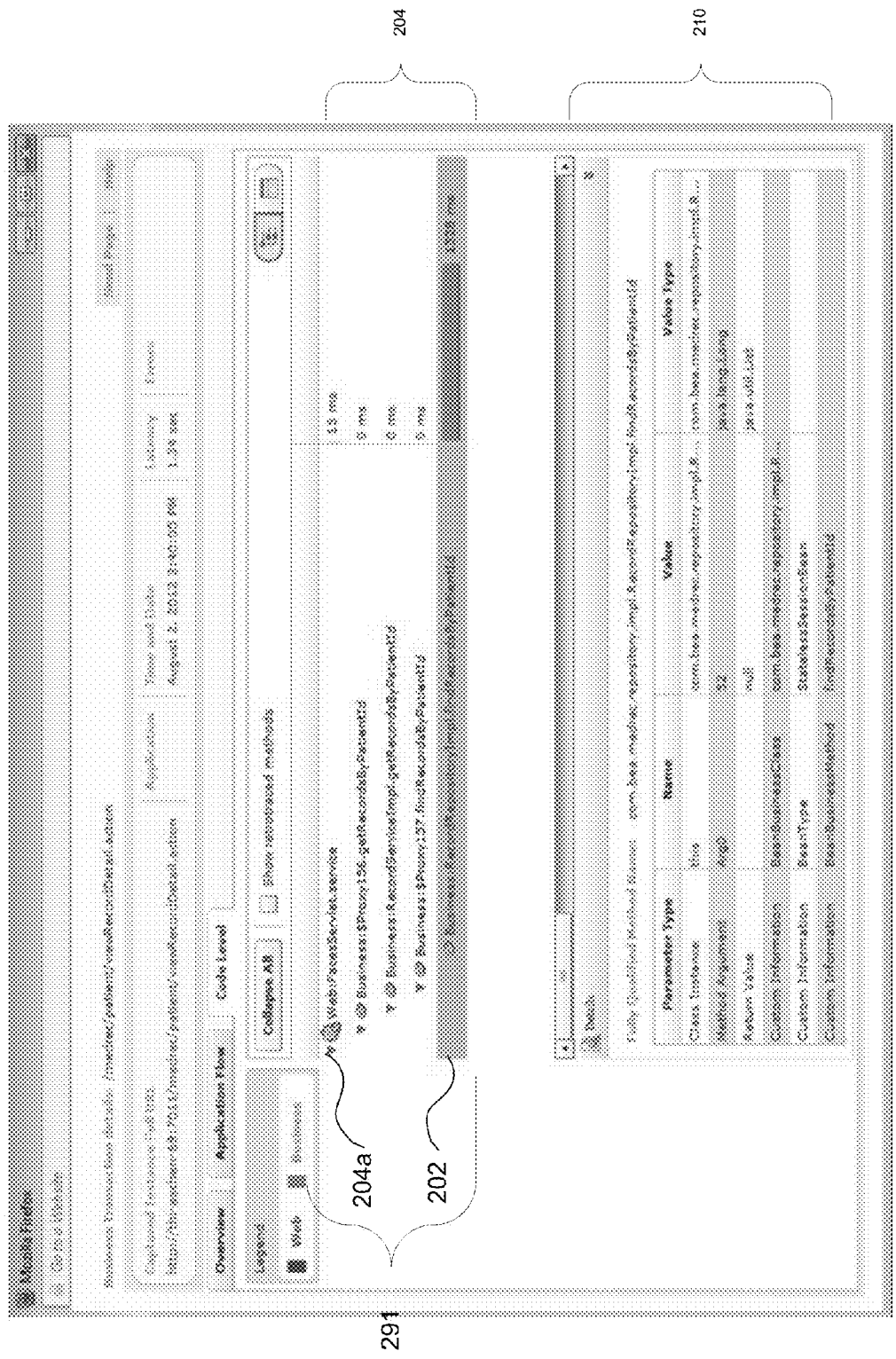
FIG. 2b is a diagram of an example embodiment of a user interface produced by a system in accordance with the disclosed subject matter.

FIG. 2b is a diagram of an example embodiment of a user interface (UI) 201 produced by a system in accordance with the disclosed subject matter. In the illustrated embodiment, a pruned subroutine call tree 291 is shown. In the illustrated embodiment, the branches of the subroutine hierarchy that do not relate on include the subroutine 202 have been pruned or removed from the subroutine call tree 291. In such an embodiment, only the information for subroutine call 202 and the subroutine calls 204 and 204a that call (either directly or indirectly) the subroutine call 202 shown or included in the pruned subroutine method call tree 291.

In various embodiments, the subroutine call tree 291 may include information pertaining to the subroutine calls included in the subroutine call tree 291. In various embodiments, the subroutine information 210 may include one or more of the following: the subroutine name, a class name or name of a data structure that includes the subroutine, the input arguments or variables and/or their values, any return values, a recording rule that caused the server device to record or include the subroutine in the subroutine call tree 291, a subroutine descriptor or signature that identifies the subroutine to the compiler or execution device (e.g., processor, virtual execution machine, etc.), a subroutine call identifier (ID) that identifies the subroutine call to the monitoring engine or other device that generated the subroutine call tree 291, and/or any extra or custom information that a user or other entity designated as desirable for capture. It is understood that the above are merely a few illustrative examples to which the disclosed subject matter is not limited.

Returning to FIG. 1, in various embodiments, subroutine call trees (e.g., subroutine call tree 290) may be very large, with only small part that is actually interesting for problem root cause analysis or other purposes. In some embodiments, many if not most subroutine call trees may not be deemed interesting at all (i.e. the subroutine call tree may not contain any interesting branches at all). In various embodiments, the server device 102 may be configured to identify "interesting" branches in the tree already at runtime and record data for those. In the illustrated embodiment, the server device 102 may be configured to prune the subroutine call tree 290 (or the data from which the subroutine call tree is derived) such that only to the "interesting" branches of the subroutine call tree remain. In such an embodiment, the server device 102 may be configured to disregard these "uninteresting" branches and, in some embodiments, entire "uninteresting" subroutine call trees. In such an embodiment, by being selective about which subroutine calls are recorded or added to the subroutine call tree system resources (e.g., time, processing cycles, memory usage, etc.) may be saved.

In various embodiments, the server device 102 may be configured to identify "interesting" branches in the tree already at runtime and record data for those. In various embodiments, what the server device 102 selects as "interesting" subroutine calls may be based upon predefined criteria or rules 135, a predefined static list of subroutine calls or points of code execution, a dynamic triggering event (e.g., exceeding a threshold between the entry and exit times, throwing an exception, a subroutine returning a null or other value, an error condition, etc.). In some embodiments, a recording rule would indicate why a subroutine 130 or subroutine call is to be recorded and include information required for subroutine or subroutine-type (e.g., based on object/class inheritance, subroutine hierarchy, etc.) specific data or information recording. It is understood that the above are merely a few illustrative examples to which the disclosed subject matter is not limited.

In such an embodiment, the server device 102 may be configured to filter out or avoid a vast majority of recorded data. Further, as described below, the in the illustrated embodiment, may be configured to perform this filtering or pruning substantially at runtime or as the application 118 or the monitored subroutines 130 are being executed.

As described above, in various embodiments, the monitoring engine 122 may be configured to collect various pieces of data regarding the selected subroutines 130. In some embodiments, subroutine information 136 may include, but is not limited to, one or more of the following: the subroutine name, a class name or name of a data structure that includes the subroutine, the input arguments or variables and/or their values, any return values, a recording rule that caused the server device to record or include the subroutine in the subroutine call tree 144, a subroutine descriptor or signature that identifies the subroutine to the compiler or execution device (e.g., processor, virtual execution machine, etc.), a subroutine call identifier (ID) that identifies the subroutine call to the monitoring engine or other device that generated the subroutine call tree 144, and/or any extra or custom information that a user or other entity designated as desirable for capture. It is understood that the above are merely a few illustrative examples to which the disclosed subject matter is not limited.

In various embodiments, each subroutine 130 or call of a subroutine 130 may be assigned or associated with a substantially unique subroutine call identifier (ID) 134. In various embodiments, the subroutine call identifier 134 may be universally unique. In another embodiment, the subroutine call identifier 134 may only be sufficiently unique to reduce the probability of an inadvertent duplication or conflict of identifiers below a certain threshold. It is understood that the above are merely a few illustrative examples to which the disclosed subject matter is not limited. In various embodiments, whenever a subroutine 130 or subroutine call is identified as "interesting" for recording, the subroutine call ID 134 may be allocated with it and this subroutine call ID 134 may be mapped to the corresponding rule that selected or marked the subroutine 130 or subroutine call as "interesting".

In various embodiments, the server device 102 may include a subroutine data registry or database (DB) 128 configured to store recorded or collected subroutine information 136. In various embodiments, a fast-retrieve mapping may exist between each subroutine call ID 134 and any data or information 136 collected or recorded. For example, such data 136 may include subroutine and class names, as well as corresponding Recording Rule 135, as described above.

In some embodiments, the monitoring engine 122 may be configured to alter the selected subroutines 130 or inject code 132 into the selected subroutines 130 in order to collect subroutine call information 136. In such an embodiment, the code injection may occur at runtime or as the subroutine 130 is about to be executed or being executed. In various embodiments, a virtual execution machine 111 may be configured to support such code injection. In another embodiment, the code injection may occur without the aid of the processing or executing device (e.g., processor 112, virtual machine 110, etc.).

In various embodiments, the injected code 132 may be injected into the body of the subroutine 130 or into the subroutine 130, itself. In another embodiment, the injected code 132 may be injected into the calling subroutine or portion of the application (e.g., before and/or after the call of the selected subroutine 130). In yet another embodiment, a mixture of the two schemes may be employed.

FIG. 3a is a diagram of an example embodiment of source code 300 used by a system in accordance with the disclosed subject matter. In the illustrated embodiment, the subroutine "doSomething" is shown as is considered "interesting" for purposes of this example. In such an embodiment, the subroutine "doSomething" accepts a string "s" as input and can either return the value "First" or "Second". Also, if an error or exception occurs a "new IllegalStateException( )" maybe returned, or (in the parlance of error handling) "thrown".

FIG. 3b is a diagram of an example embodiment of source code 301 used by a system in accordance with the disclosed subject matter. It is understood that the source code 301 is a representation of what un-compiled or de-compiled source code may look like once the injected code has been added to the subroutine "doSomething". In various embodiments, the code may be injected after compilation such as via editing a compiled, assembly, or byte-code, via the manipulation of data structures in memory, via a programmatic means such as an Application Programming Interface (API) provided by a virtual execution machine, or injected using another scheme, etc. In such an embodiment, the source code 301 illustrated by FIG. 3b may never exist, as the source code is shown pre-compilation. However, one skilled in the art will understand that course source code 301 provides an illustration of a human-readable version of what one embodiment of a selected subroutine may look and/or function like after the code injection.

In the illustrated embodiment, the subroutine "doSomething" has had four pieces of code 302, 304, 306, and 308 injected into it. In some embodiments, the injected code, which in the illustrated embodiment are themselves subroutine calls, may fall into two broad categories, injected subroutines that act when the monitored subroutine is first called or entered (e.g., code 302) and injected subroutines that act when the monitored subroutine is terminated or exited (e.g., code 302, 304, or 306). It is understood that the above is merely one illustrative example to which the disclosed subject matter is not limited.

In one embodiment, subroutine call 302 may include a "record Entry" or subroutine entry injected code portion. In such an embodiment, the subroutine entry injected code may be configured to cause a subroutine entry array element and stack element to be created, as described below in reference to subroutine array 140 and subroutine stack 142. In the illustrated embodiment, the subroutine entry injected code may not accept as input any of the input parameters of the selected subroutine ("doSomething"). In another embodiment, such input parameters may be input to the subroutine entry injected code. In such an embodiment, this may be useful if the input arguments are likely to change before the subroutine exits or returns a value (e.g., when input arguments are passed by reference or as a memory pointer or address to a data structure, etc.). It is understood that the above are merely a few illustrative examples to which the disclosed subject matter is not limited.

In various embodiments, the subroutine calls 306 and 308 may include a "record Return" or subroutine exit injected code portion. In such an embodiment, the subroutine exit injected code may call a subroutine just before the selected subroutine ("doSomething") exits or returns a value. In the illustrated embodiment, the selected subroutine may return one of two values (s1 or s2), and therefore, the two subroutine calls 306 and 308 may be injected into the code 301. In the illustrated embodiment, the code may be restructured such that temporary variables are explicitly used instead of the implicit variables that were used in the un-injected source code 300. It is understood that the above is merely one illustrative example to which the disclosed subject matter is not limited.

In the illustrated embodiment, each of the subroutine calls 306 and 308 may accept as input, the identifier associated with the selected subroutine (e.g., 35), the value to be returned form the selected subroutine (e.g., "First" or "Second" as the variables s1 or s2, respectively), and the input arguments to the selected subroutine (e.g., the string "s"). These values and any other information collected by the subroutine exit injected code (e.g., exit time, etc.) may be stored as part of the subroutine call information, as described above. Also, as described above, in various embodiments, the subroutine entry injected code may return the input arguments of the selected subroutine. In yet another embodiment, both the subroutine entry and exit injected code portions may report the input arguments of the selected subroutine. In such an embodiment, a comparison of any changes made to the input arguments (either by the selected subroutine or another portion of the application) during the execution of the selected subroutine may be collected. It is understood that the above are merely a few illustrative examples to which the disclosed subject matter is not limited.

In various embodiments, a subroutine call 304 may include a "recordThorwn" or subroutine exit-by-error injected code portion. In such an embodiment, the subroutine exit-by-error injected code portion may be similar to the subroutine exit injected code portions 306 and 308, but may called when the selected subroutine encounters an error or exception or exits abnormally. In such an embodiment, in addition to the ID of the selected subroutine (e.g. 35), and in various embodiments, the input arguments of the selected subroutine (e.g., s), the subroutine exit-by-error injected code portion may also collect information regarding the exception or error that caused the selected subroutine to exit (e.g., the object t). It is understood that the above are merely a few illustrative examples to which the disclosed subject matter is not limited.

Returning to FIG. 1, in various embodiments, once the subroutine call information 136 has been collected via the injected code 132, it may be stored in in the subroutine data database 128. As described above, in various embodiments, the monitoring engine 122 may collect subroutine call information 136 regarding every subroutine call. However, in a preferred embodiment, the monitoring engine 122 may only collect subroutine call information 136 for subroutine calls that are selected as being interesting or being associated with an interesting subroutine call.

In one embodiment, the server device 102 may include a pruning engine 124. In such an embodiment, the pruning engine 124 may be configured to manage the collection of the subroutine call information 136 and reducing the amount of subroutine call information 136 collected and the amount of system resources (e.g., processor cycles, memory usage, etc.) used while collecting the subroutine call information 136.

In the illustrated embodiment, the pruning engine 124 may include or manage a subroutine call array 140 and/or a subroutine call stack 142 or data structure based on the concept of last-in-first-out (LIFO). In some embodiments, other forms of data structures may be employed. It is understood that the above are merely a few illustrative examples to which the disclosed subject matter is not limited.

In various embodiments, an array 140 and stack 142 may be created and associated with a particular execution thread or instance of a portion of the application 118. In the embodiment in which the application 118 provides a service or responds to requests from another computing device (not shown), an array 140 and stack 142 may be created and associated with each server or application 118 request.

In various embodiments, the subroutine call array 140 and subroutine stack 142 may include information that represents the hierarchy and call structure of a portion of the subroutines calls made during the execution of the application 118. In some embodiments, the subroutine call array 140 and subroutine stack 142 may be updated, added to, and pruned during the execution of the application 118. In such an embodiment, as a subroutine call or entry is made a corresponding subroutine call entry element may be added or made to the subroutine call array 140 and/or subroutine stack 142. Likewise, as a subroutine call exits either the corresponding subroutine call entry element may be removed or pruned from the subroutine call array 140 and/or subroutine stack 142 or a corresponding subroutine call exit element may be added or made to the subroutine call array 140 and/or subroutine stack 142. In various embodiments, the decision to prune or to add a subroutine call element may be based upon whether or not the subroutine call was selected or deemed interesting or was a parent subroutine call of an interesting or selected subroutine call. An embodiment of this process is described in more detail below in reference to FIGS. 4a-4o.

In various embodiments, the server device 102 may include a formatting engine 126. In such an embodiment, the formatting engine 126 may be configured to convert the subroutine call array 140 into a pruned subroutine call tree 144 or other data structure that may be employed for software analysis of the application 118. An embodiment of this process is described in more detail below in reference to FIG. 5.

Figure 4A:
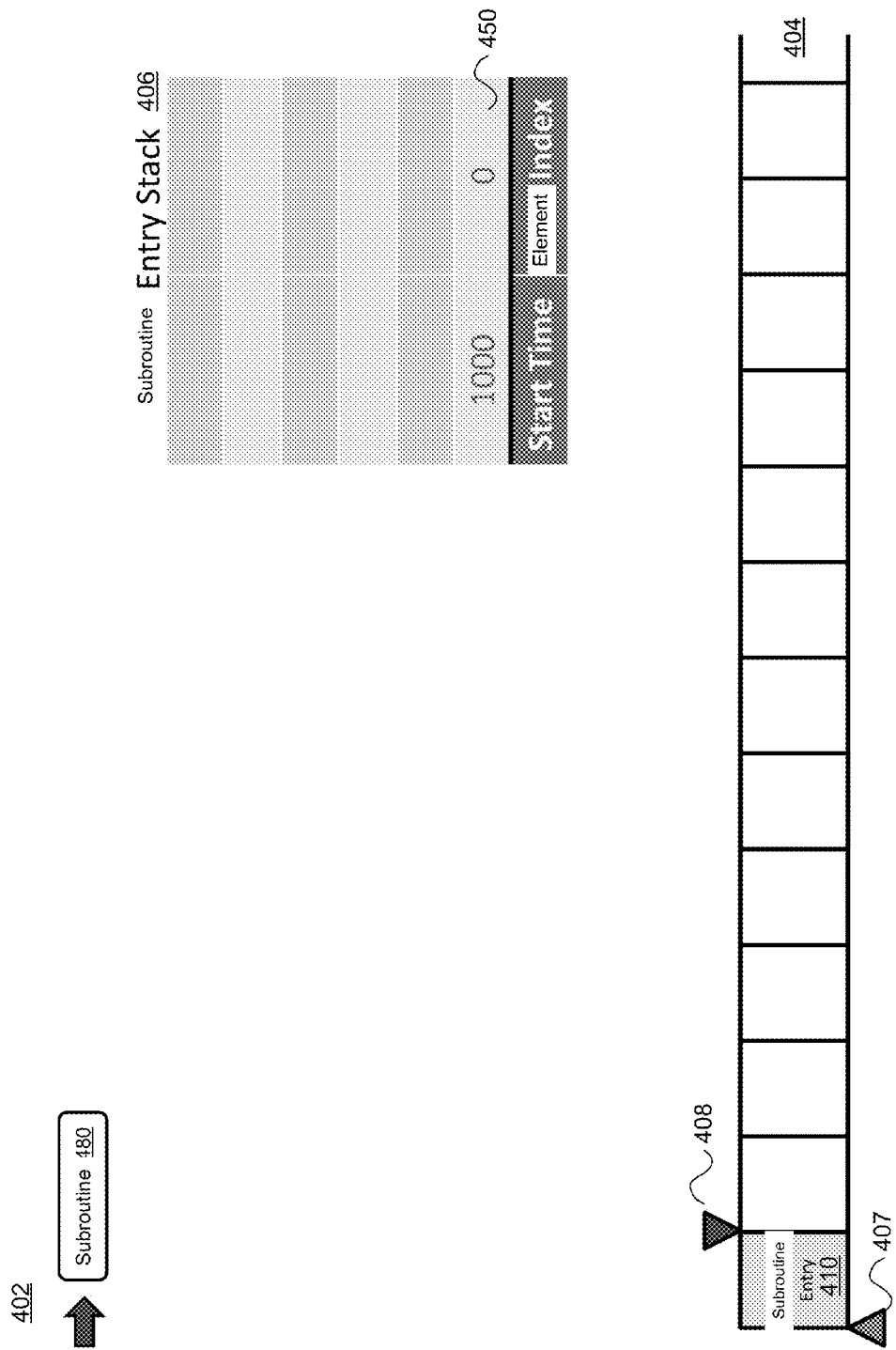
FIG. 4a is a diagram of example embodiments of data structures used by a system in accordance with the disclosed subject matter.

FIG. 4a is a diagram of example embodiments of data structures 404 and 406 used by a system in accordance with the disclosed subject matter. Further, FIGS. 4a-4o illustrate a series of example events and subroutine calls and exits and the effect those subroutine calls/exits have on the data structured 404 and 406.

In various embodiments, graph 402 may illustrate a number of subroutine calls made while executing an application. In various embodiments, the array 404 may be configured to store subroutine call entry/exit elements that represent subroutine call entry or exit points. In some embodiments, the stack 406 may be configured to temporarily store subroutine call information. As described above, in various embodiments, other data structures may be used and it is understood that the above are merely illustrative examples to which the disclosed subject matter is not limited.

In the illustrated embodiment, the array 404 may include a data index 408. In some embodiments, the data index 408 may be configured to points to the next memory space within the array 404 to store data or subroutine call elements. In the illustrated embodiment, the array 404 may include a persist index 407. In some embodiments, the persist index 407 may be configured to mark the last index for stored data or subroutine call element that is to be persisted or not pruned.

In the illustrated embodiment, the subroutine 480 may be called or entered (illustrated by the arrow). In such an embodiment, in response to the entry or calling of the subroutine 480, a timestamp or start time associated with the subroutine 480 call may be created. In various embodiments, a subroutine call entry element 410 may be added to the array 404 at the next available position. In such an embodiment, as a result of the added subroutine call element, the data index 408 may be incremented or moved by one.

In some embodiments, the creation of an object or memory structure for each subroutine call entry element, which may be made for each subroutine call as the application executes, may be considered expensive in terms of system resources (e.g., memory usage, computation time, etc.). This may be true especially for applications that include thousands of subroutine calls. Therefore, in various embodiments, in order to at least partially reduce the system resource usage, a single subroutine call entry element 410 may be used or employed for every subroutine call entry element added to the array 404. In various embodiments, the subroutine call entry element 410 may include a null or empty element. In another embodiment, the subroutine call entry element 410 may include a pointer to a shared or generic subroutine call entry element, such that the system resource costs of creating a new object or data structure for the subroutine call entry element 410. It is understood that the above is merely one illustrative example to which the disclosed subject matter is not limited.

In various embodiments, once the subroutine call entry element 410 has been added to the array 404, a stack element 450 may be placed on the stack 406. In some embodiments, the stack element 450 may include an entry time associated with the subroutine call 402 and the data index 408 associated with the subroutine call's 408 entry element 410. In various embodiments, the stack 406 may be configured to temporarily store subroutine call information (e.g., the entry time, etc.).

In some embodiments, if the subroutine call entry element 410 is null or does not include subroutine call information, the stack 406 may be used to store the subroutine call information that would normally be stored in the subroutine call entry element 410. In such an embodiment, the stack 406 may be pre-allocated in memory. As a result, there may be very little system resource usage in storing or removing data from the stack 406. In such an embodiment, it may be preferable to temporarily store subroutine call information within the stack 406. It is understood that the above is merely one illustrative example to which the disclosed subject matter is not limited.

Figure 4B:
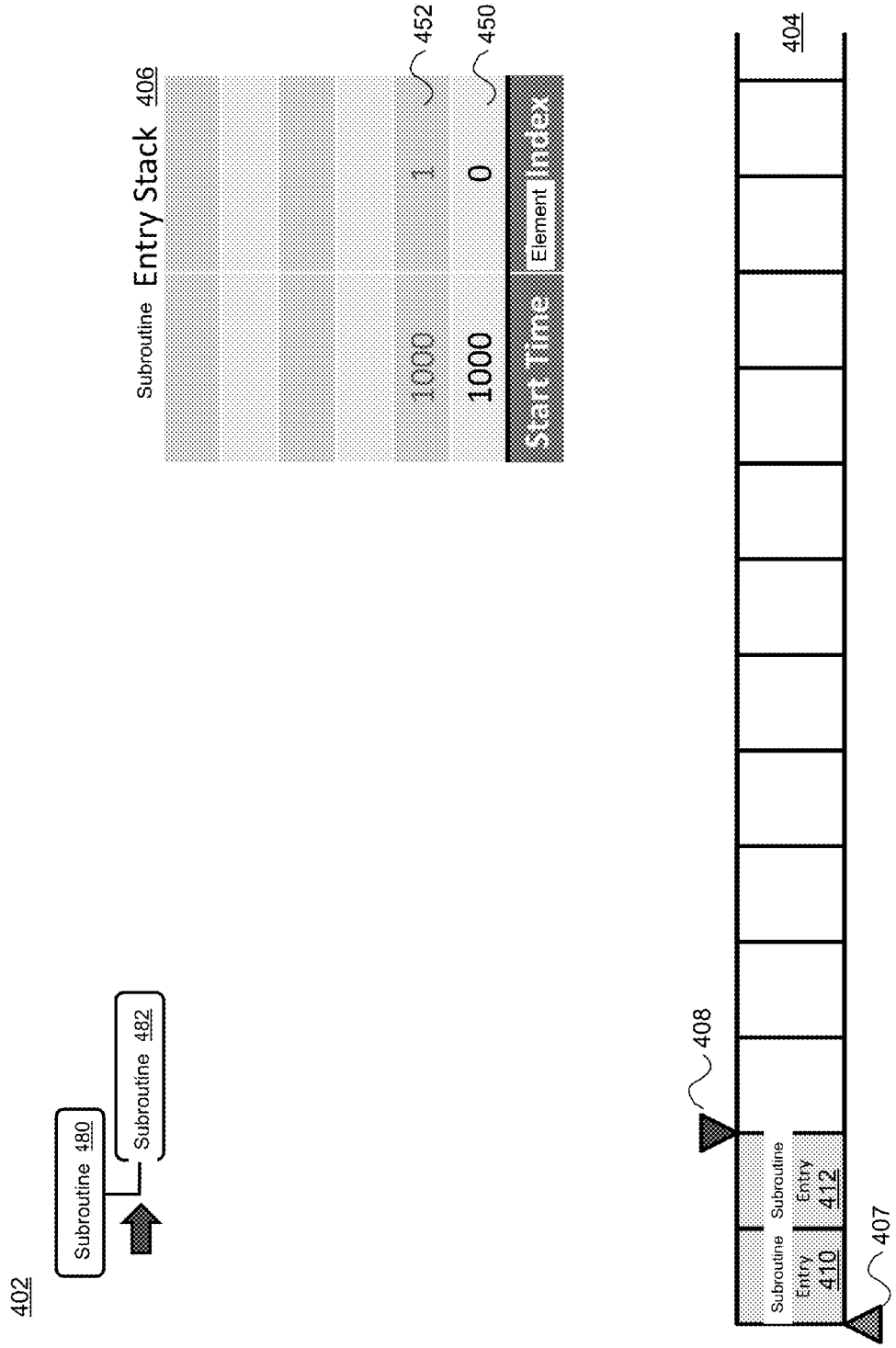
FIG. 4b is a diagram of example embodiments of data structures used by a system in accordance with the disclosed subject matter.

FIG. 4b is a diagram of example embodiments of data structures 404 and 406 used by a system in accordance with the disclosed subject matter. In various embodiments, the subroutine 480 may call subroutine 482. As described above, this subroutine call may result in a subroutine call entry element 412 being added to the next position in the array 404, the incrementing of the data index 408, and the placing of the stack element 452 to the stack 406.

Figure 4C:
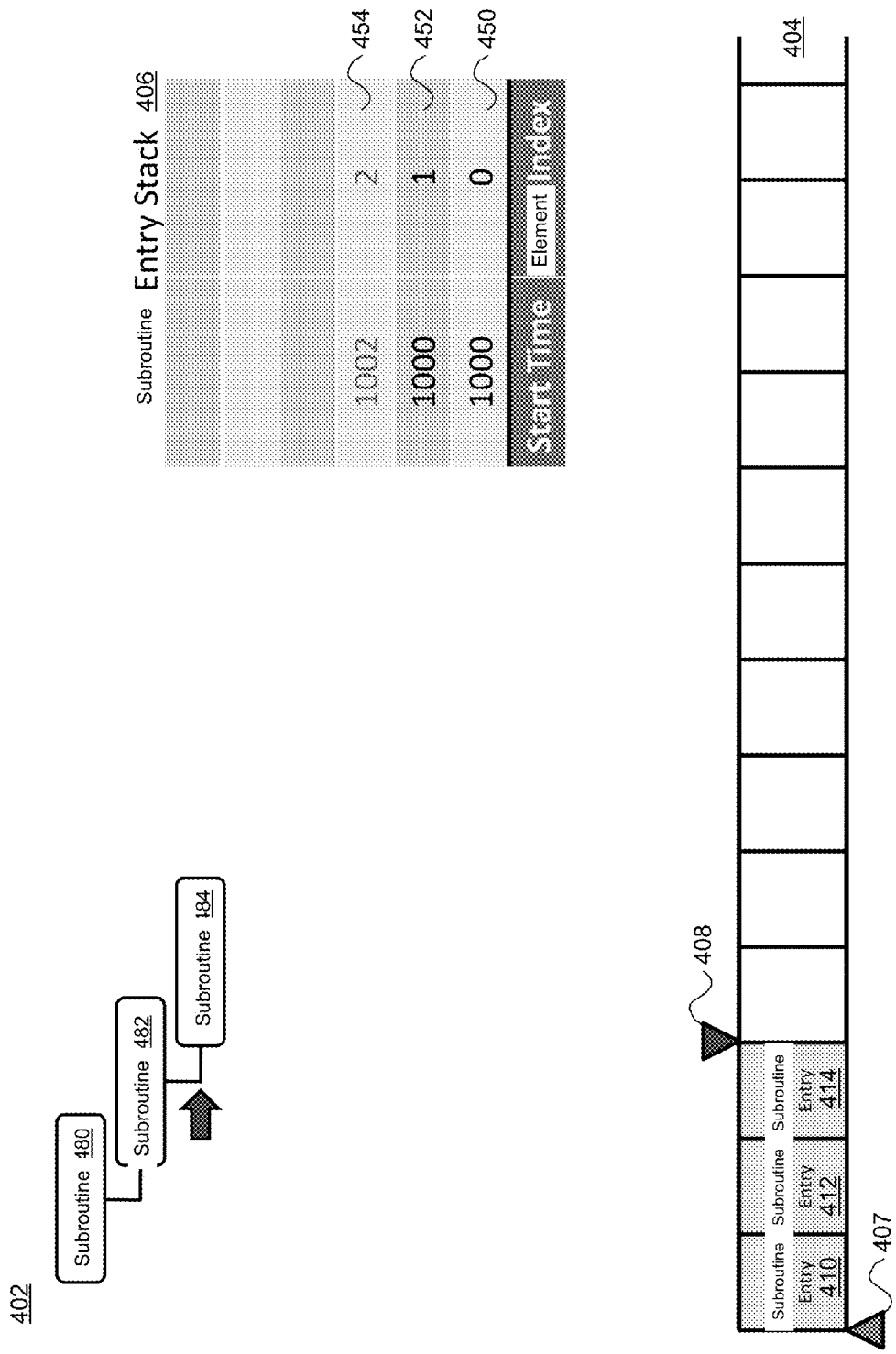
FIG. 4c is a diagram of example embodiments of data structures used by a system in accordance with the disclosed subject matter.

FIG. 4c is a diagram of example embodiments of data structures 404 and 406 used by a system in accordance with the disclosed subject matter. In various embodiments, the subroutine 482 may call subroutine 484. As described above, this subroutine call may result in a subroutine call entry element 414 being added to the next position in the array 404, the incrementing of the data index 408, and the placing of the stack element 454 to the stack 406.

Figure 4D:
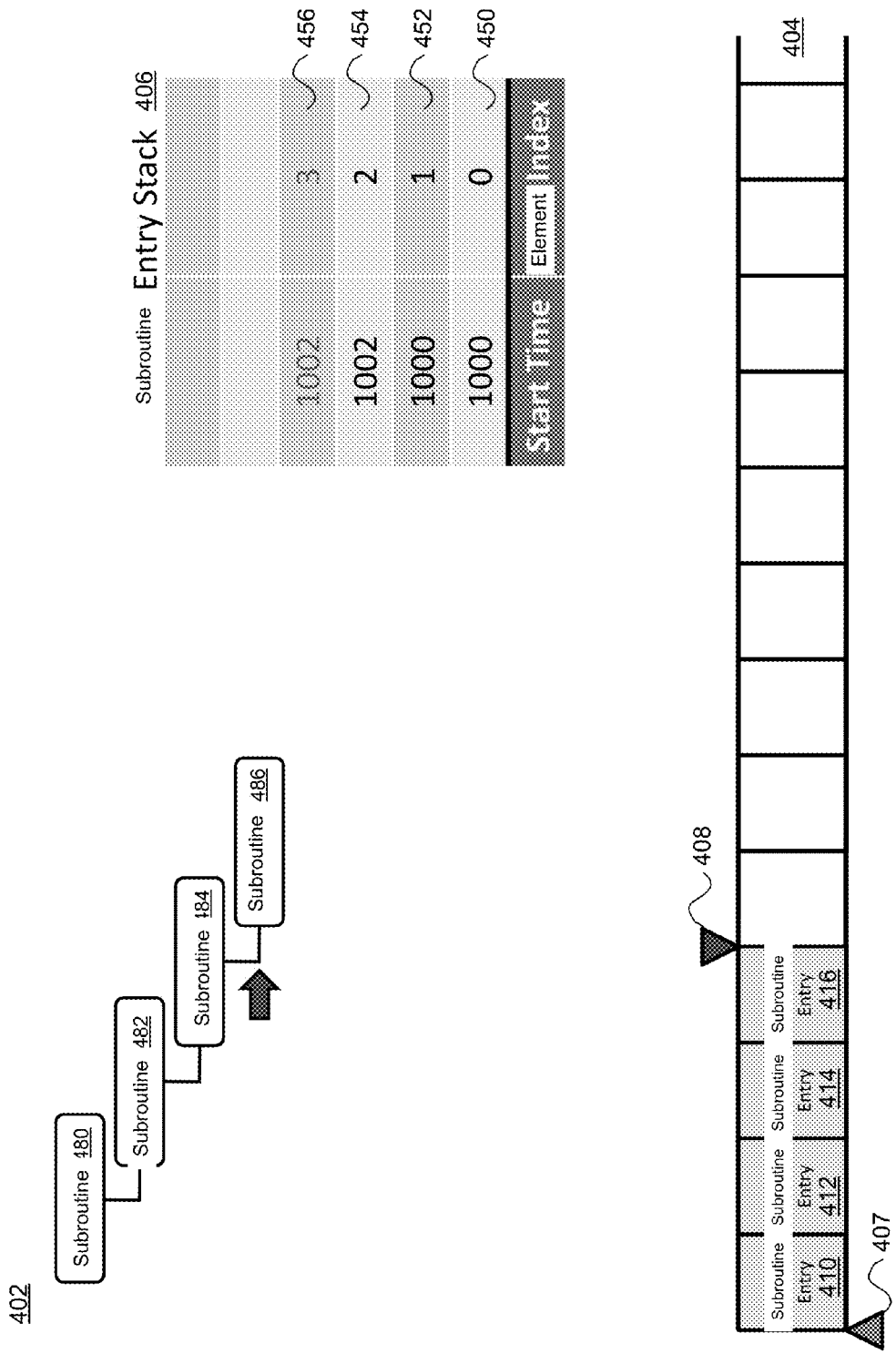
FIG. 4d is a diagram of example embodiments of data structures used by a system in accordance with the disclosed subject matter.

FIG. 4d is a diagram of example embodiments of data structures 404 and 406 used by a system in accordance with the disclosed subject matter. In various embodiments, the subroutine 484 may call subroutine 486. As described above, this subroutine call may result in a subroutine call entry element 416 being added to the next position in the array 404, the incrementing of the data index 408, and the placing of the stack element 456 to the stack 406.

FIG. 4e is a diagram of example embodiments of data structures 404 and 406 used by a system in accordance with the disclosed subject matter. In various embodiments, the subroutine 486 may exit. In the illustrated embodiment, the exit of subroutine 486 may occur uneventfully and the subroutine call of subroutine 486 may not be selected for preservation or viewed as "interesting".

In the illustrated embodiment, upon the exit of subroutine 486 the recording structures or subroutine call information (e.g., input arguments, returned value, etc.) may be collected. In various embodiments, this may be accomplished via the code injected into the subroutine 486.

In such an embodiment, a timestamp associated the exit time of the subroutine 486 may be recorded. In various embodiments, the stack element 456 may be popped off or retrieved from the stack 406. In some embodiments, the entry time may be compared against the exit time in order to determine if the duration of the subroutine call exceeds a threshold value, and therefore is judged to be interesting. Although, it is understood that the above is merely one illustrative example to which the disclosed subject matter is not limited.

In the illustrated embodiment, the call of subroutine 486 is judged to not be "interesting" and the subroutine call entry element 416 is not selected for preservation. In such an embodiment, the subroutine call entry element 416 may be removed from the array 404 and the data index 408 decremented.

Figure 4F:
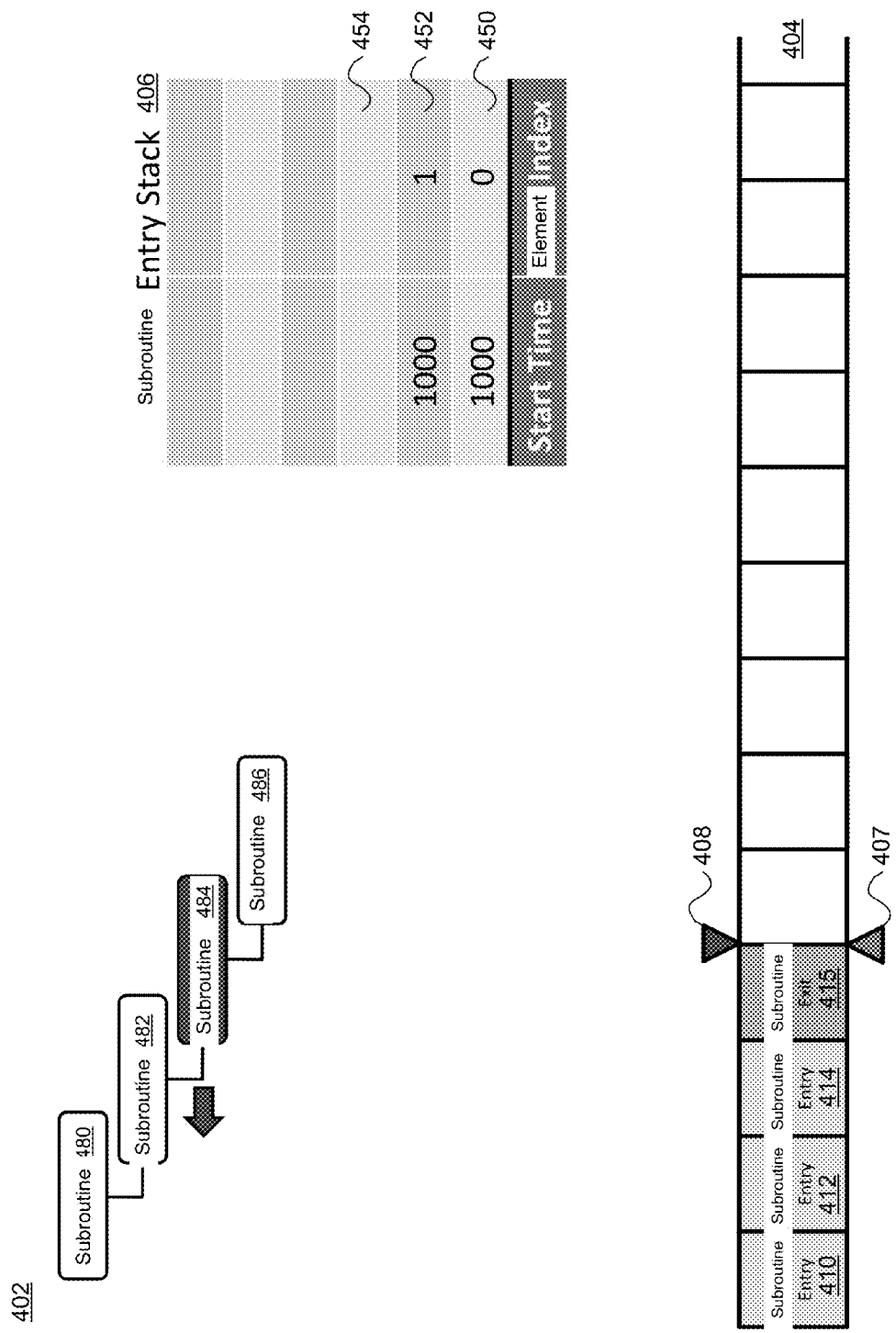
FIG. 4f is a diagram of example embodiments of data structures used by a system in accordance with the disclosed subject matter.

FIG. 4f is a diagram of example embodiments of data structures 404 and 406 used by a system in accordance with the disclosed subject matter. In various embodiments, the subroutine 484 may exit. In the illustrated embodiment, the exit of subroutine 484 may be selected for preservation or viewed as "interesting".

As described above, the exit time for the exit of subroutine 484 may be recorded and compared against the entry time stored in the stack 406. In the illustrated embodiment, the processing time involved in the call to subroutine 484 may have exceeded a threshold value, and the subroutine call may be marked as "interesting". In various embodiments, other reasons a subroutine call may be considered "interesting" may include the subroutine exiting abnormally (e.g., throwing an exception, etc.), the subroutine call fulfilling a recording rule or predefined set of criteria, if the subroutine call is a parent subroutine call to another that was selected as being "interesting", etc. It is understood that the above are merely a few illustrative examples to which the disclosed subject matter is not limited.

In such an embodiment, a subroutine call exit element 415 may be added to the array 404. In various embodiments, the subroutine call exit element 415 may include the subroutine call information associated with the subroutine call 484. This may include at least the entry time value stored in the stack element 454. In various embodiments, the stack element 454 may be removed from the stack 406. In some embodiments, the persist index 407 may be moved to the current subroutine call exit element 415.

In various embodiments, unlike the subroutine call entry elements, which do not involve the creation of an object or data structure and therefore result in minimal system resource usage, the addition or creation of a subroutine call exit element may result in a unique object or data structure. However, in various embodiments, the number of "interesting" subroutine calls and therefore a subroutine call exit elements may be very small compared to the number of total or uninteresting subroutine calls. In such an embodiment, the impact on system resources may be far smaller than embodiments in which all subroutine call elements (entry and exit) result in the creation of an object or data structure.

Figure 4G:
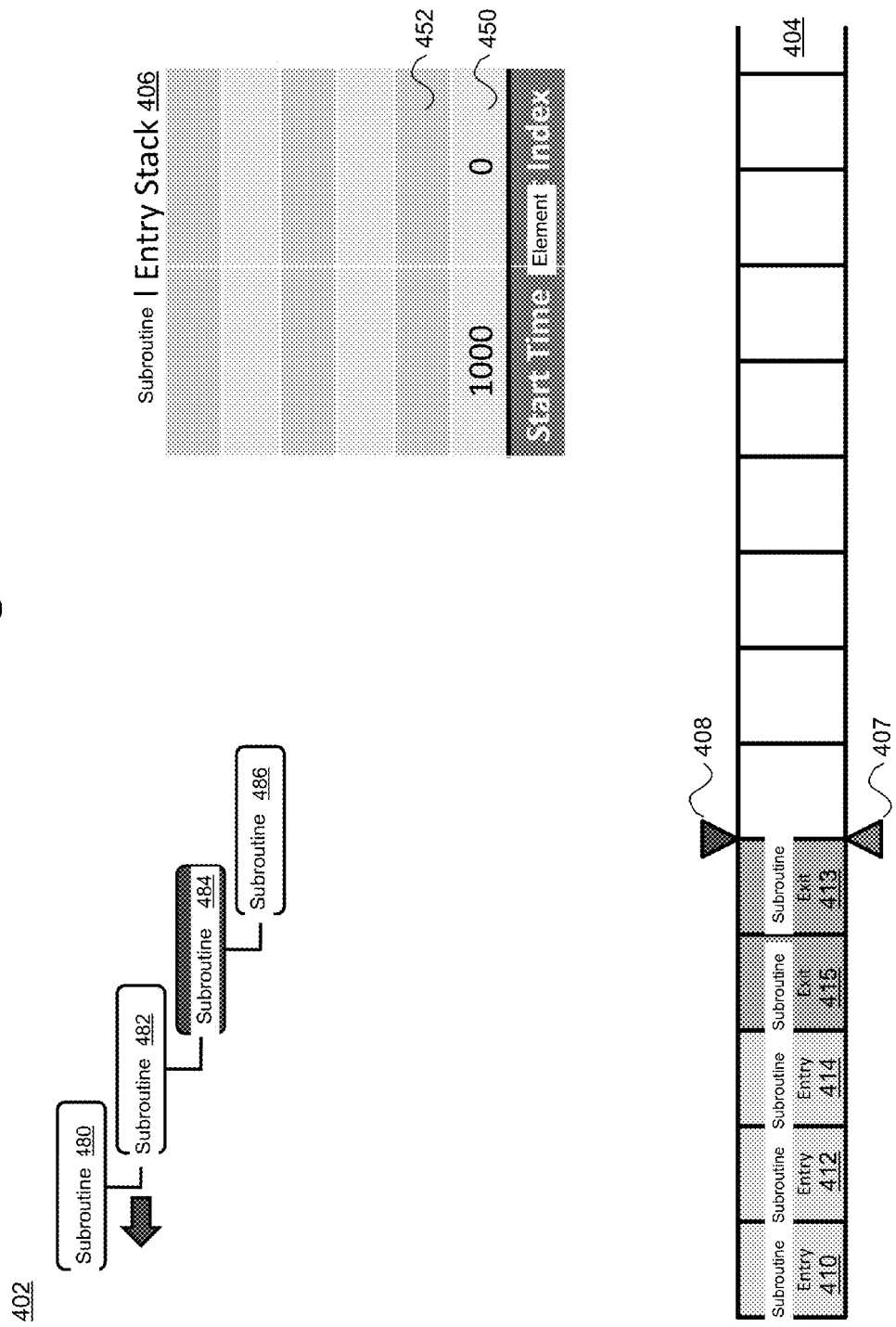
FIG. 4g is a diagram of example embodiments of data structures used by a system in accordance with the disclosed subject matter.

FIG. 4g is a diagram of example embodiments of data structures 404 and 406 used by a system in accordance with the disclosed subject matter. In various embodiments, the subroutine 482 may exit. In the illustrated embodiment, as the parent subroutine call of the "interesting" or preserved subroutine call 484 the subroutine call 482 may also be preserved. In some embodiments, this determination may be made by determine if the persist index 407 is greater or equal to the start index 408. It is understood that the above is merely one illustrative example to which the disclosed subject matter is not limited.

In such an embodiment, the subroutine call information may be included in or associated with a subroutine call exit element 413, and the start index 408 and persist index 407 may be incremented. Further, the stack element or element 452 may be removed or the stack 406.

FIG. 4h is a diagram of example embodiments of data structures 404 and 406 used by a system in accordance with the disclosed subject matter. In various embodiments, the subroutine 490 may be called by the subroutine 480. In the illustrated embodiment, this may result in a new branch of the graph 402 that is unrelated to the prior preserved or persisted subroutine calls 482 and 484.

In such an embodiment, a new subroutine call entry element 420 may be added to the array 404 and the start index 408 may be incremented. In various embodiments, the entry timestamp and the value of the start index 408 may be stored in the stack 406 as stack element 460.

Figure 4I:
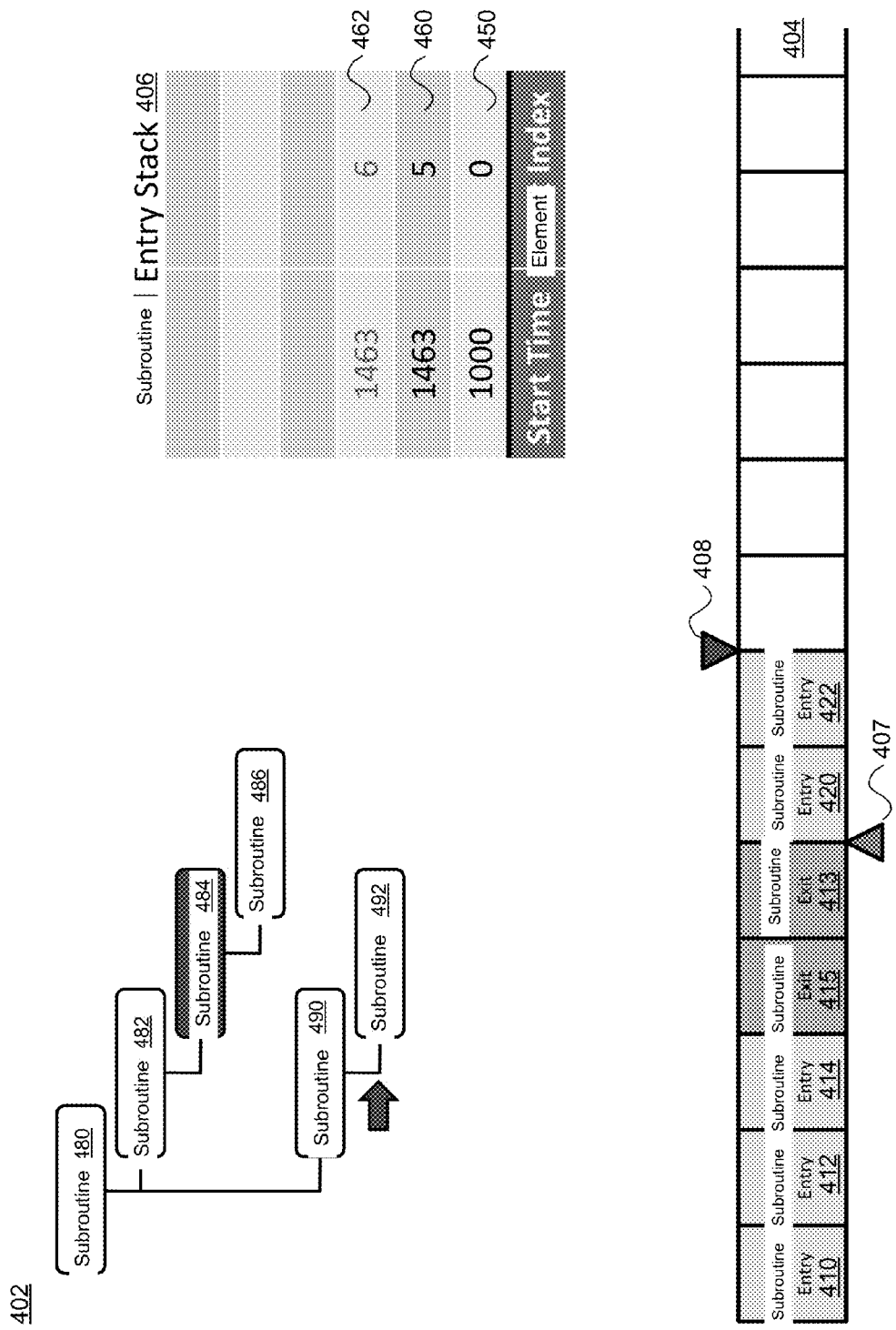
FIG. 4i is a diagram of example embodiments of data structures used by a system in accordance with the disclosed subject matter.

FIG. 4i is a diagram of example embodiments of data structures 404 and 406 used by a system in accordance with the disclosed subject matter. In various embodiments, the subroutine 490 may call subroutine 492. As described above, this subroutine call may result in a subroutine call entry element 422 being added to the next position in the array 404, the incrementing of the data index 408, and the placing of the stack element 462 to the stack 406.

Figure 4J:
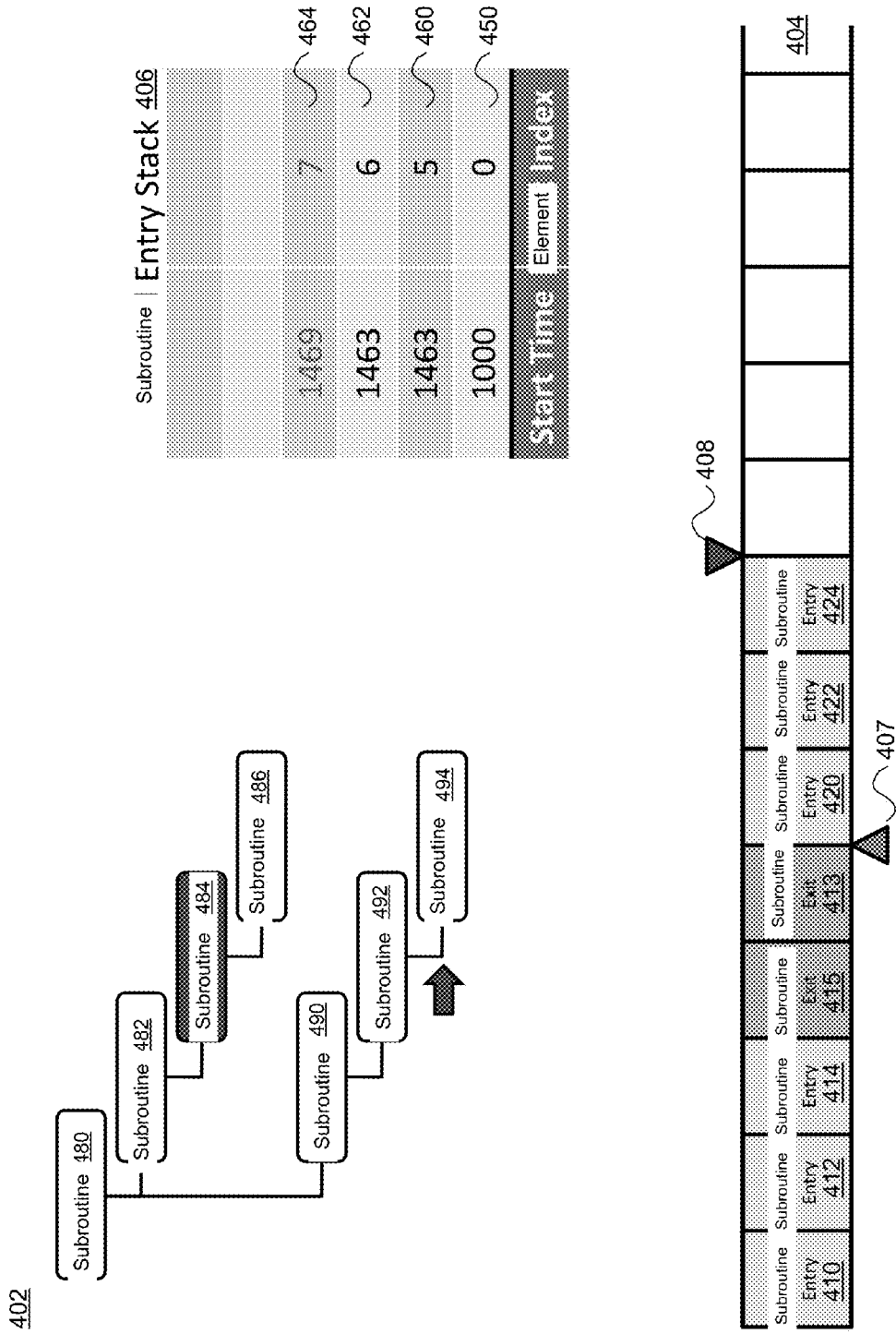
FIG. 4j is a diagram of example embodiments of data structures used by a system in accordance with the disclosed subject matter.

FIG. 4j is a diagram of example embodiments of data structures 404 and 406 used by a system in accordance with the disclosed subject matter. In various embodiments, the subroutine 492 may call subroutine 494. As described above, this subroutine call may result in a subroutine call entry element 424 being added to the next position in the array 404, the incrementing of the data index 408, and the placing of the stack element 464 to the stack 406.

Figure 4K:
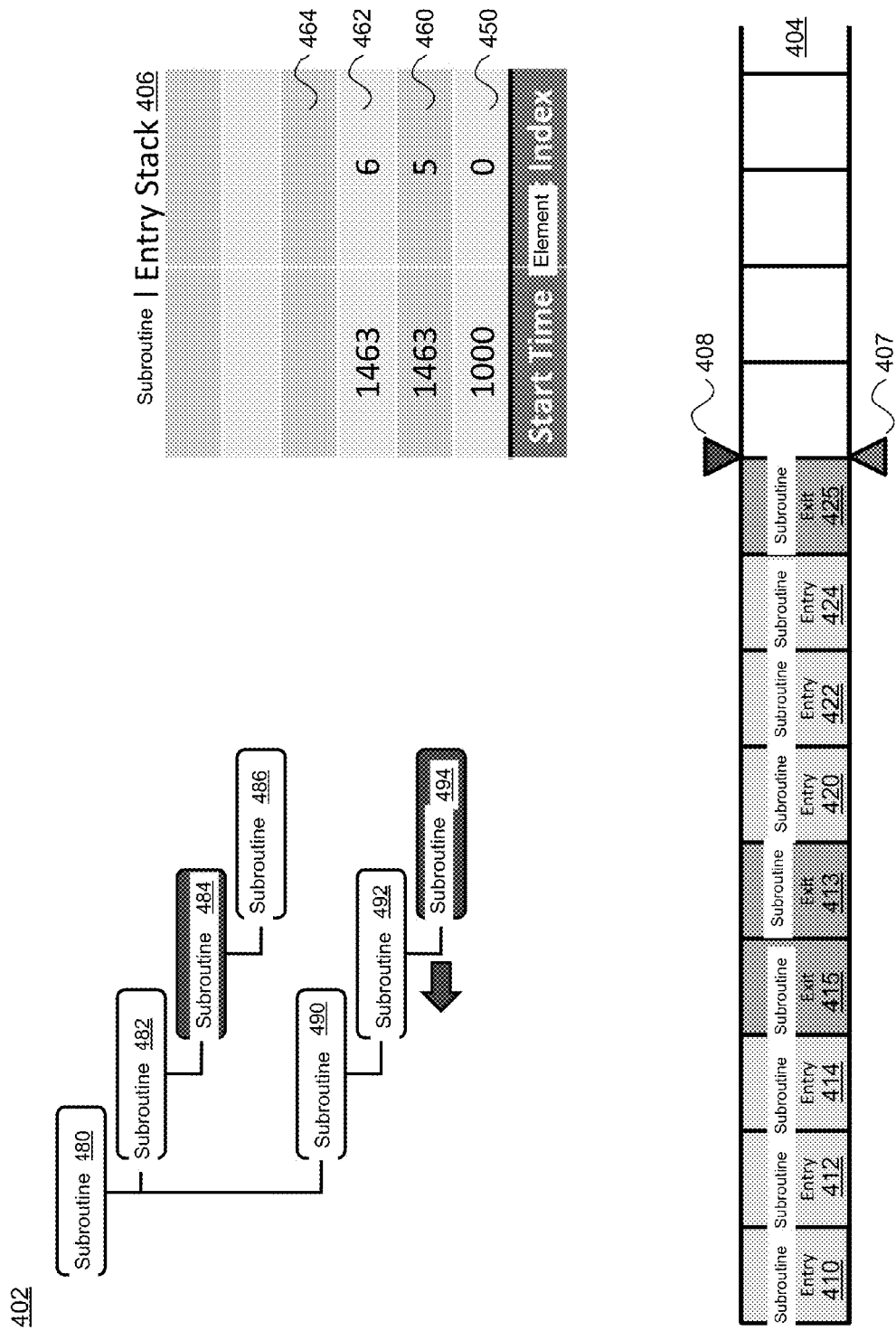
FIG. 4k is a diagram of example embodiments of data structures used by a system in accordance with the disclosed subject matter.
Figure 4I:
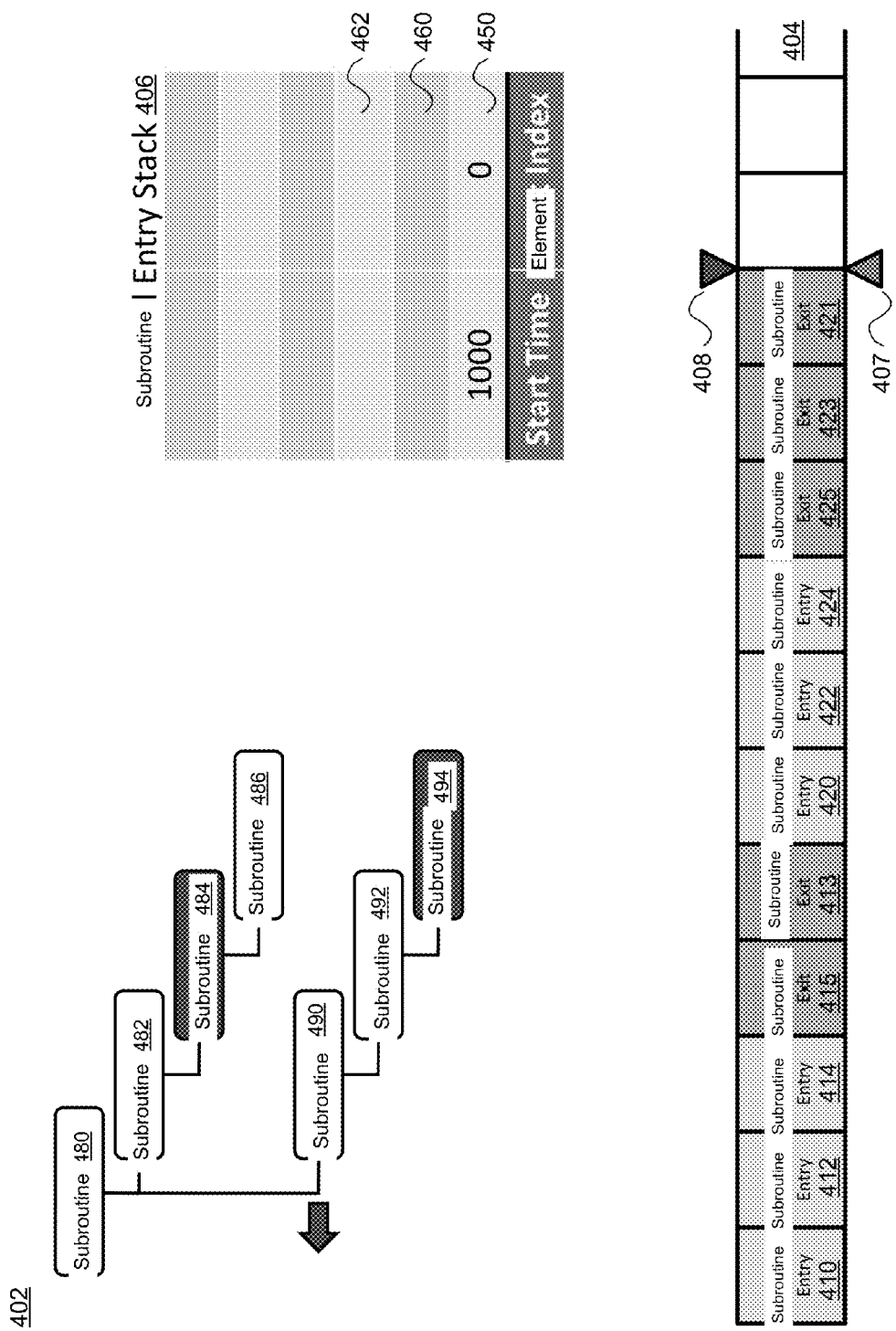

FIG. 4k is a diagram of example embodiments of data structures 404 and 406 used by a system in accordance with the disclosed subject matter. In various embodiments, the subroutine 494 may exit. In the illustrated embodiment, the exit of subroutine 494 may be selected for preservation or viewed as "interesting". For example, the subroutine call 494 may exit abnormally (e.g., throw an exception, etc.). It is understood that the above is merely one illustrative example to which the disclosed subject matter is not limited.

In such an embodiment, a subroutine call exit element 425 may be added to the array 404. The start index 408 may be incremented. In various embodiments, the subroutine call exit element 425 may include the subroutine call information associated with the subroutine call 494. This may include at least the entry time value stored in the stack element 464. In various embodiments, the stack element 464 may be removed from the stack 406. In some embodiments, the persist index 407 may be moved to the current subroutine call exit element 425.

FIG. 4l is a diagram of example embodiments of data structures 404 and 406 used by a system in accordance with the disclosed subject matter. In various embodiments, between the events of FIGS. 4k and 4l, both the subroutines 492 and 490 may have exited. In the illustrated embodiment, as subroutine call 494 was marked or selected for preservation and subroutine 492 directly called the subroutine 494 and the subroutine 490 indirectly (via subroutine 492) called the subroutine 494, both subroutines 492 and 490 are considered parent subroutine calls to a preserved subroutine call 494. As parent subroutine calls to a preserved subroutine call 494, the subroutines 490 and 492 may be selected or marked for preservation.

In such an embodiment, a subroutine call exit elements 423 and 451 may be added to the array 404. The start index 408 may be incremented twice. In various embodiments, the subroutine call exit elements 423 and 451 may include the subroutine call information associated with the subroutine calls 492 and 490, respectively. This may include at least the entry time values stored in the stack elements 462 and 460, respectively. In various embodiments, the stack elements 462 and 460 may be removed from the stack 406. In some embodiments, the persist index 407 may be moved to the current subroutine call exit element 421.

Figure 4M:
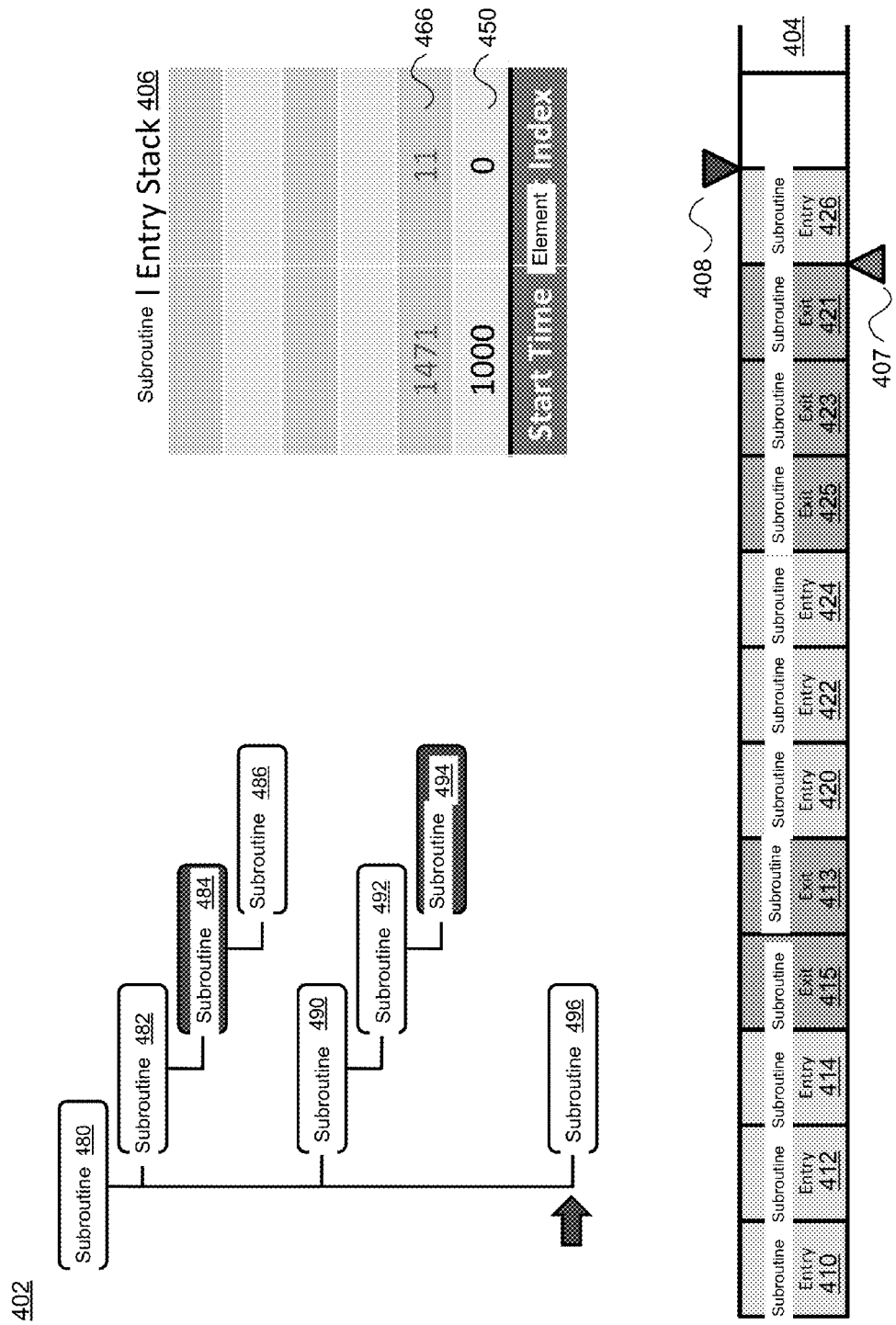
FIG. 4m is a diagram of example embodiments of data structures used by a system in accordance with the disclosed subject matter.

FIG. 4m is a diagram of example embodiments of data structures 404 and 406 used by a system in accordance with the disclosed subject matter. In various embodiments, the subroutine 496 may be called by the subroutine 480. In the illustrated embodiment, this may result in another new branch of the graph 402 that is unrelated to the prior preserved or persisted subroutine calls 482 and 484, or subroutine calls 490, 492 and 494.

In such an embodiment, a new subroutine call entry element 426 may be added to the array 404 and the start index 408 may be incremented. In various embodiments, the entry timestamp and the value of the start index 408 may be stored in the stack 406 as stack element 466.

Figure 4N:
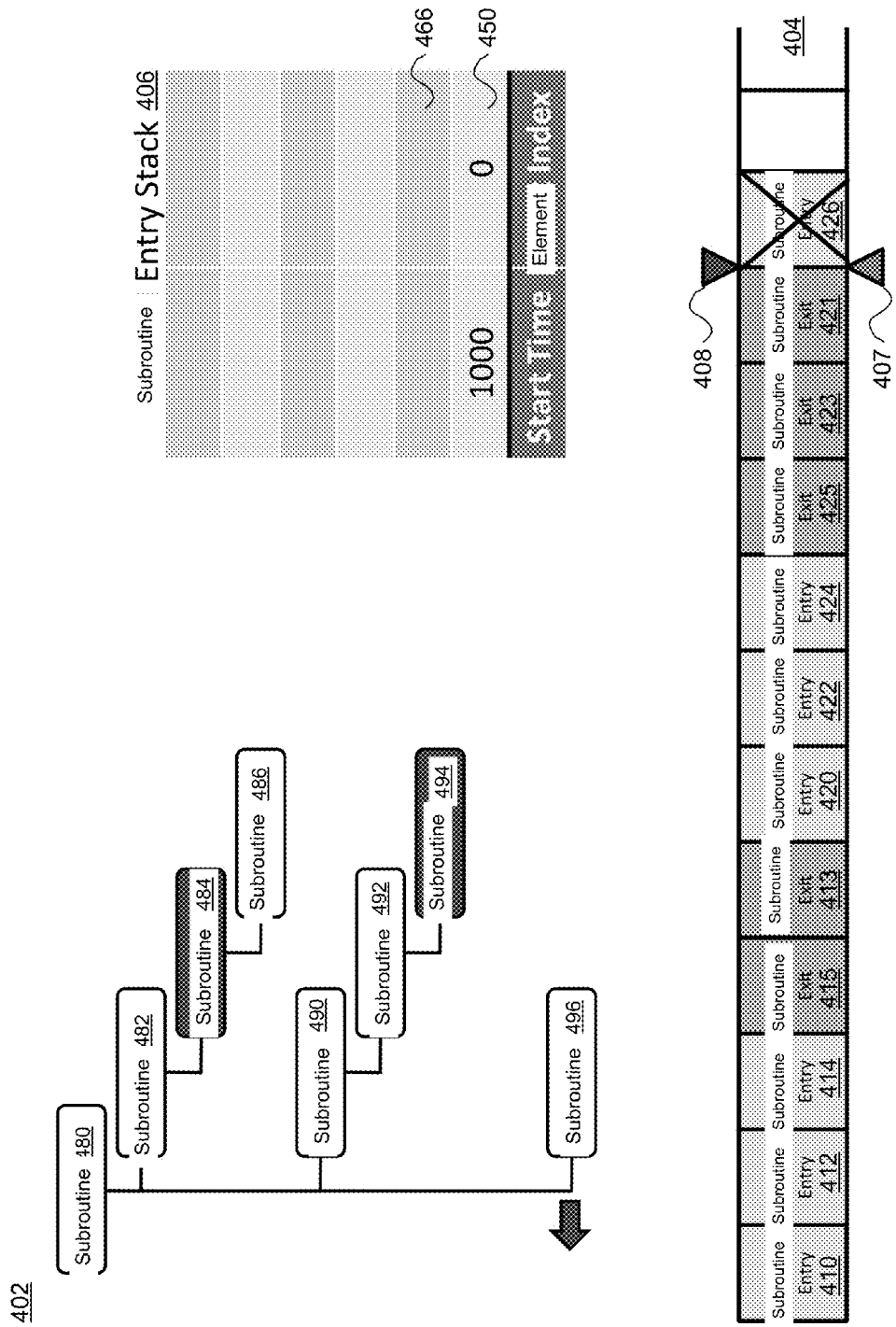
FIG. 4n is a diagram of example embodiments of data structures used by a system in accordance with the disclosed subject matter.

FIG. 4n is a diagram of example embodiments of data structures 404 and 406 used by a system in accordance with the disclosed subject matter. In various embodiments, the subroutine 496 may exit. In the illustrated embodiment, the exit of subroutine 496 may occur uneventfully and the subroutine call of subroutine 496 may not be selected for preservation or viewed as "interesting".

In the illustrated embodiment, upon the exit of subroutine 496 the recording structures or subroutine call information (e.g., input arguments, returned value, etc.) may be collected. In various embodiments, this may be accomplished via the code injected into the subroutine 496.

In the illustrated embodiment, the call of subroutine 496 is judged to not be "interesting" and the subroutine call entry element 426 is not selected for preservation. In such an embodiment, the subroutine call entry element 426 may be removed from the array 404 and the data index 408 decremented. The start index 408 may be decremented.

FIG. 4o is a diagram of example embodiments of data structures 404 and 406 used by a system in accordance with the disclosed subject matter. In various embodiments, the subroutine 480 may exit. As described above, a the subroutine 480 is a parent subroutine of the prior preserved or persisted subroutine calls 482 and 484, or subroutine calls 490, 492 and 494, subroutine 480 itself may be preserved.

In such an embodiment, a subroutine call exit element 411 may be added to the array 404. The start index 408 may be incremented. In various embodiments, the subroutine call exit element 411 may include the subroutine call information associated with the subroutine call 480. This may include at least the entry time value stored in the stack element 450. In various embodiments, the stack element 450 may be removed from the stack 406. In some embodiments, the persist index 407 may be moved to the current subroutine call exit element 411.

Graph 402 illustrates the subroutine relationships and calling patterns of that portion of the application. In various embodiments, the array 404 may include or point to the subroutine call information of all the preserved or resisted subroutines (e.g., subroutines 480, 482, 484, 490, 492, ad 494). Further, in some embodiments, this may have been done without storing the subroutine call information for each and every subroutine call (except partially and temporarily on the stack 406), and the corresponding processor and memory usage the creation and sorting of so many objects may have entailed. In such an embodiment, the minimized or reduced system resource usage of the monitoring and pruning may allow for these activities to occur during or substantially simultaneously with the execution of the monitored software application.

In various embodiments, the stack 406 may be destroyed or de-allocated. In another embodiment, the stack 406 or memory locations used to store the stack 406 may be re-allocated to a different thread monitoring operation. It is understood that the above are merely a few illustrative examples to which the disclosed subject matter is not limited.

Figure 5:
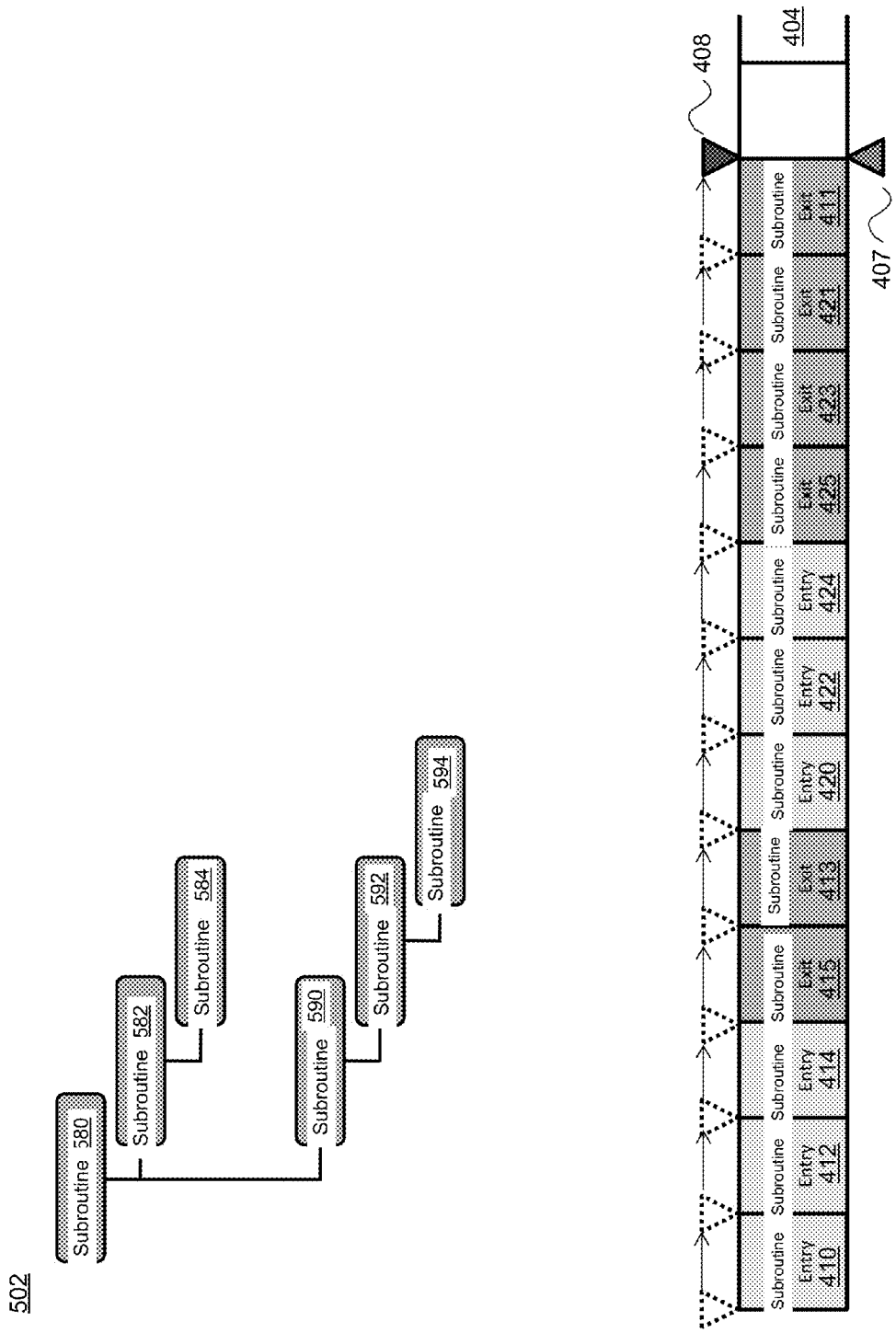
FIG. 5 is a diagram of example embodiments of data structures used by a system in accordance with the disclosed subject matter.

FIG. 5 is a diagram of example embodiments of data structures 404 and 502 used by a system in accordance with the disclosed subject matter. In the illustrated embodiment, the array 404 is used to construct a subroutine call tree 502 that includes the subroutine call information for each subroutine call in the tree 502. It is understood that a subroutine call tree is merely one illustrative example of a final data structure to which the disclosed subject matter is not limited.

In various embodiments, the "formatting phase" may include a stage of processing in which the subroutine call array 404 is parsed and converted into a subroutine call tree 502 (or other data structure).

In one embodiment, the start index 408 may be moved back to the start of the array 404. In some embodiments, from that position the start index 408 may be incremented or walked towards the persist index 407. In such an embodiment, as a subroutine call entry element is passed a corresponding subroutine entry is formed in the subroutine call tree 502. In various embodiments, upon the order of the subroutine call entry elements and the subroutine call exit elements, a subroutine call hierarchy and parent-child relationship status may be derived. This may be especially easy with applications based on programming languages that require a single root or top-level subroutine (e.g., main( ) etc.).

For example, subroutine call entry element 410 may cause a root or top level subroutine call 580 to be added to the tree 502. Likewise, the subroutine call entry elements 412 and 414 may result in the creation of subroutine call 582 and 584, respectively.

Upon the traversal of a subroutine call exit element (e.g., element 415) the subroutine call information associated with the element 415 may be retrieved. In one embodiment, the subroutine call information may be included with the element 415. In another embodiment, a pointer to the subroutine call information may be included with element 415. For example, such a pointer may allow the formatting engine to retrieve the subroutine call information from a subroutine repository or data DB, as described above. This subroutine call information may be added or associated with the respective subroutine calls of the tree 502.

In the illustrated embodiment, a subroutine call entry element may indicate that a subroutine call is further down the hierarchy in the tree 502. For example, the entry element 414 after entry element 412 indicates that subroutine 584 is called by, subordinate to, or in a child-relationship with the subroutine 582.

Conversely, a second or subsequent subroutine call exit element may indicate that formatting engine may move up the hierarchy of the tree 502. For example, the exit element 415 after entry element 414 indicates that the associated subroutine call information is also associated with subroutine 584 (which is on the same hierarchy level as the entry element 414). However, as the second exit element in a row, the exit element 413 is associated with the subroutine call 582, which is up one level from the prior subroutine call 584.

Likewise, an entry element (e.g., element 420) after an exit element (e.g., element 413) may indicate that a new branch has started on the tree 502. For example, entry element 420 indicates that subroutine call 590 should start in a new branch. As described above, entry elements 422 and 424 are associated with subroutine calls 592 and 594, respectively. As described above, the exit elements 425, 423, 421 and 413 are associated with the subroutine calls 594, 592, 590, and 58-0, respectively.

In various embodiments, once the start index 408 has been moved to the end of the array 404 the generation of the subroutine call tree 502 may be stopped. In another embodiment, the stopping event may be when the start index 408 and the persist index 407 are equal. It is understood that the above are merely a few illustrative examples to which the disclosed subject matter is not limited.

In the illustrated embodiment, the subroutine call tree 502 has been pruned of uninteresting or unwanted subroutine calls. Specifically, comparing the tree 502 of FIG. 5 to the graph 402 of FIG. 4*o* shows that the subroutines 486 and 496 have been pruned from the full subroutine s calls hierarchy.

Further in various embodiments, as the formatting and generation of the subroutine call tree 502 involved only the moving of indexes and the reassignment or copying of data (the subroutine call information, etc.) as opposed to costly comparison of multiple data structures and the allocation of memory space for pruned objects, the formatting and generation of the subroutine call tree 502 may occur either while another portion of the application is being executed, while the pruning process of FIGS. 4*a*-4*o* is still going one (e.g., in a pipelined fashion, etc.), or generally without the need for processing after the application has finished executing. It is understood that the above are merely a few illustrative examples to which the disclosed subject matter is not limited.

Figure 6:
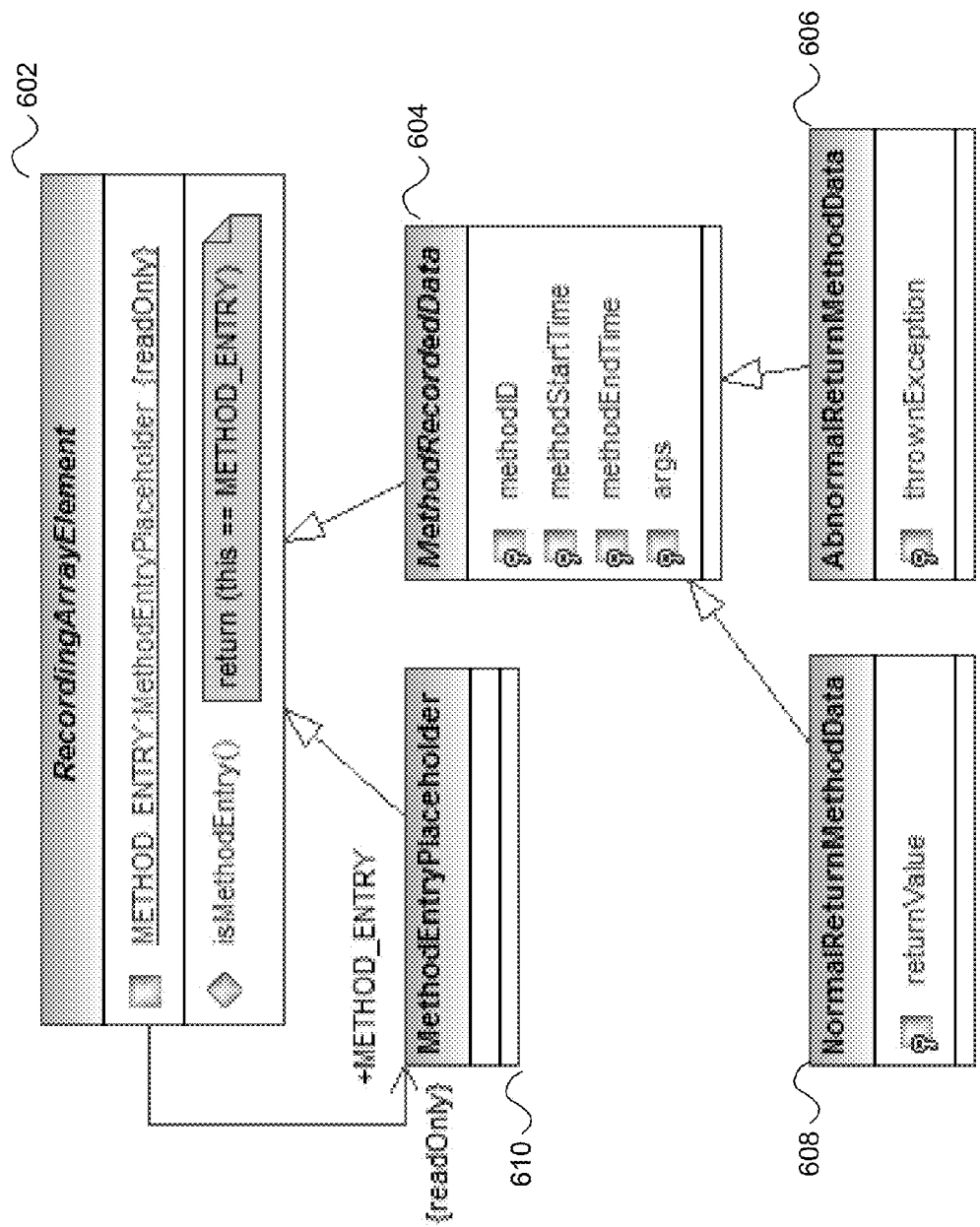
FIG. 6 is a diagram of example embodiments of data structures used by a system in accordance with the disclosed subject matter.

FIG. 6 is a diagram of example embodiments of data structures 600 used by a system in accordance with the disclosed subject matter. In various embodiments, these data structures, classes, or objects 600 may be used in the subroutine call array as subroutine call elements.

In one embodiment, the MethodEntryPlacement class 610 may be a class used for subroutine call entry elements. In the illustrated embodiment, the MethodEntryPlacement class 610 may include an empty or shell class. Further, in various embodiments, the MethodEntryPlacement class 610 may be static or a singleton such that only one instance of the MethodEntryPlacement class 610 may be created. In such an embodiment, this may reduce the system resources required to place multiple subroutine call entry elements within the subroutine call array as all subroutine call entry elements may point to or reference a single object and no additional object creation may be required. It is understood that the above is merely one illustrative example to which the disclosed subject matter is not limited.

In one embodiment, the MethodRecordData class 604 may be a class used for subroutine call exit elements. In various embodiments, the MethodRecordData class 604 may define that it is configured to store at least portions of the subroutine call information (e.g., subroutine call ID, subroutine call start and exit time, input arguments, etc.).

In some embodiments, classes NormalReturnMethodData 608 and AbnormalReturnMethodData 606 may be configured to store the data acquired at the exit of the subroutine call (e.g., return values, throw exceptions, etc.). In various embodiments, instances of these classes 606 and 608 may be included by the class 610.

In various embodiments, the RecordingArrayElement class 602 may be configured to provide subroutines, and variables or properties for each sub-class (e.g., classes 604 and 610). It is understood that the above is merely one illustrative example to which the disclosed subject matter is not limited.

It is understood that the above are merely a few illustrative examples to which the disclosed subject matter is not limited. In various embodiments, other data structures may be employed. For example, in various embodiments, an object-oriented set of classes may not even be used.

FIG. 7 is a flow chart of an example embodiment of a technique 700 in accordance with the disclosed subject matter. In various embodiments, the technique 700 may be used or produced by a system such as that of FIG. 1. Furthermore, portions of technique 700 may be make use of or produce user interfaces, code, or data structures such as that of FIG. 2*a*, 2*b*, 3*a*, 3*b*, 4*a*-*o*, 5, or 6. Although, it is understood that the above are merely a few illustrative examples to which the disclosed subject matter is not limited. It is understood that the disclosed subject matter is not limited to the ordering of or number of actions illustrated by technique 700.

Block 702 illustrates that, in one embodiment, the execution of at least a portion of a software application may be monitored, as described above. In various embodiments, monitoring may include injecting code into the plurality of subroutine calls for which execution data is collected, as described above. In various embodiments, one or more of the action(s) illustrated by this Block may be performed by the apparatuses or systems of FIG. 1, the monitoring engine of FIG. 1, as described above.

Block 704 illustrates that, in one embodiment, subroutine call information regarding a plurality of subroutine calls included by the portion of the software application may be collected, as described above. In various embodiments, one or more of the subroutine calls may be selected for detailed data recording, as described above. In some embodiments, collecting subroutine call information may include collecting, only for each subroutine call selected for detail data recording, all of the input arguments passed to the subroutine call and a return value, if any, from the call of a respective subroutine, as described above. In various embodiments, collecting subroutine call information may include, for each call to a subroutine call, placing on a memory stack an entry time associated with the subroutine call, and a pointer to a subroutine entry element included in an array and associated with the subroutine call. In various embodiments, one or more of the action(s) illustrated by this Block may be performed by the apparatuses or systems of FIG. 1, the monitoring engine and/or pruning engine of FIG. 1, as described above.

Block 706 illustrates that, in one embodiment, as the software application is being executed, a subroutine call tree may be pruned to include only the subroutine calls selected for detailed data recording and one or more parent subroutine calls of each subroutine calls selected for detailed data recording, as described above. In some embodiments, pruning a subroutine call tree may include maintaining an array of subroutine call elements. In various embodiments, maintaining may include removing, from the array, subroutine call elements associated with subroutine calls to be pruned from the subroutine call tree, as described above. In some embodiments, maintaining may also include generating the subroutine call tree based upon the array of subroutine call elements, as described above.

In various embodiments, maintaining the array may include adding a subroutine call entry element when a respective subroutine is called, and removing, when the respective subroutine exits, the subroutine call entry element if the subroutine entry element is not marked for preservation, as described above. In some embodiments, adding a subroutine entry element may include adding a pointer to a single shared subroutine call entry element, as described above. In such an embodiment, the single shared subroutine call entry element may be created only once and referenced by each subroutine call entry element included in the array, as described above.

In another embodiment, maintaining the array may include selecting a subroutine entry element for preservation if the subroutine entry element is associated with a subroutine call that is selected for detailed data recording or associated with a parent subroutine call of the subroutine call that is selected for detailed data recording, as described above. In yet another embodiment, maintaining the array may include, if a subroutine call element is selected for preservation, adding a subroutine exit element to the array, as described above. In such an embodiment, the subroutine exit element may include subroutine call information regarding a subroutine call associated with the subroutine call element that is selected for preservation, as described above. In various embodiments, one or more of the action(s) illustrated by this Block may be performed by the apparatuses or systems of FIG. 1, the pruning engine and/or formatting engine of FIG. 1, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method executed by a processor, comprising:
monitoring the execution of at least a portion of a software application;
collecting subroutine call information regarding a plurality of subroutine calls included by the portion of the software application;
selecting one or more of the plurality of subroutine calls for detailed data recording;
maintaining an array of one or more subroutine call elements, the maintaining including:
adding a single shared subroutine call entry element to the array;
adding a first subroutine call entry element to the array when a first subroutine is called, the first subroutine call entry element including a first pointer to the single shared subroutine call entry element;
adding a second subroutine call entry element to the array when a second subroutine is called, the second subroutine call entry element including a second pointer to the single shared subroutine call entry element; and
removing, when the second subroutine exits, the second subroutine call entry element from the array based on determining that the second subroutine is not selected for detailed data recording; and
generating a subroutine call tree based on the array of one or more subroutine call elements.

2. The method of claim 1, wherein the monitoring includes injecting code into the plurality of subroutine calls selected for detailed data recording.

3. The method of claim 1, wherein collecting subroutine call information includes, only for each subroutine call selected for detail data recording, collecting all of the input arguments passed to the subroutine call and a return value, if any, from the call of a respective subroutine.

4. The method of claim 1, wherein maintaining the array of one or more subroutine call elements further includes:
adding, when the first subroutine exits, a first subroutine call exit element to the array based on determining that the first subroutine is selected for-detailed data recording.

5. The method of claim 1, wherein maintaining the array of one or more subroutine call elements further includes:
not removing, when the first subroutine exits, the first subroutine call entry element from the array based on determining that the first subroutine is selected for detailed data recording or based on determining that the first subroutine is associated with a parent subroutine that is selected for detailed data recording.

6. The method of claim 1, wherein collecting subroutine call information includes:
for each subroutine call, placing on a memory stack an entry time associated with the subroutine call, and a pointer to a subroutine call entry element included in the array and associated with the subroutine call.

7. The method of claim 4, wherein the first subroutine call exit element includes subroutine call information regarding the first subroutine call.

8. An apparatus comprising:
a monitoring engine configured to:
monitor execution of at least a portion of a software application,
a processor configured to:
execute the software application,
select one or more of a plurality of subroutine calls for detailed data recording, the plurality of subroutine calls included by the portion of the software application, and
generate a subroutine call tree based on an array of one or more subroutine call elements,
a pruning engine configured to:
manage collecting of subroutine call information regarding the plurality of subroutine calls included by the portion of the software application, and
maintain the array of one or more subroutine call elements, the maintaining including:
adding a single shared subroutine call entry element to the array;
adding a first subroutine call entry element to the array when a first subroutine is called, the first subroutine call entry element including a first pointer to the single shared subroutine call entry element,
adding a second subroutine call entry element to the array when a second subroutine is called, the second subroutine call entry element including a second pointer to the single shared subroutine call entry element; and
removing, when the second subroutine exits, the second subroutine call entry element from the array based on determining that the second subroutine is not selected for detailed data recording, and
a memory configured to:
store the subroutine call information.

9. The apparatus of claim 8, wherein the monitoring engine is further configured to:
inject code into the plurality of subroutine calls selected for detailed data recording.

10. The apparatus of claim 8, wherein managing collecting of subroutine call information includes, only for each subroutine call selected for detail data recording, collecting all of the input arguments passed to the subroutine call and a return value, if any, from the call of a respective subroutine.

11. The apparatus of claim 8, wherein maintaining the array of one or more subroutine call elements further includes:
adding, when the first subroutine exits, a first subroutine call exit element to the array based on determining that the first subroutine is selected for detailed data recording.

12. The apparatus of claim 8, wherein maintaining the array of one or more subroutine elements further includes:
not removing, when the first subroutine exits, the first subroutine call entry element from the array based on determining that the first subroutine is selected for detailed data recording or based on determining that the first subroutine is associated with a parent subroutine that is selected for detailed data recording.

13. The apparatus of claim 8,
wherein the memory includes a memory stack; and
wherein the processor is further configured to:
for each subroutine call, place on the memory stack an entry time associated with the subroutine call, and a pointer to a subroutine call entry element included in the array and associated with the subroutine call.

14. The apparatus of claim 11, wherein the first subroutine call exit element includes subroutine call information regarding the first subroutine call.

15. A computer program product for aiding software analysis, the computer program product being tangibly and non-transitorily embodied on a non-transitory computer-readable medium and including executable code that, when executed, is configured to cause an apparatus to:
monitor the execution of at least a portion of a software application;
collect subroutine call information regarding a plurality of subroutine calls included by the portion of the software application;
select one or more of the subroutine calls for detailed data recording;
maintain an array of one or more subroutine call elements, the maintaining including:
adding a single shared subroutine call entry element to the array;
adding a first subroutine call entry element to the array when a first subroutine is called, the first subroutine call entry element including a first pointer to the single shared subroutine call entry element;
adding a second subroutine call entry element to the array when a second subroutine is called, the second subroutine call entry element including a second pointer to the single shared subroutine call entry element; and
removing, when the second subroutine exits, the second subroutine call entry element from the array based on determining that the second subroutine is not selected for detailed data recording; and
generate a subroutine call tree based on the array of one or more subroutine call elements.

16. The computer program product of claim 15, wherein the executable code, when executed, is configured to further cause the apparatus to:
only for each subroutine call selected for detail data recording, collect all of the input arguments passed to the subroutine call and a return value, if any, from the call of a respective subroutine.

17. The method of claim 1, further comprising:
pruning, as the software application is being executed, the subroutine call tree to include only the subroutine calls selected for detailed data recording and one or more parent subroutine calls for each of the subroutine calls selected for detailed data recording.

18. The apparatus of claim 8, wherein the pruning engine is further configured to:

prune, as the software application is being executed, the subroutine call tree to include only the subroutine calls selected for detailed data recording and one or more parent subroutine calls for each of the subroutine calls selected for detailed data recording.

\* \* \* \* \*

UNITED STATES PATENT AND TRADEMARK OFFICE
CERTIFICATE OF CORRECTION

PATENT NO. : 9,436,588 B2  
APPLICATION NO. : 13/630784  
DATED : September 6, 2016  
INVENTOR(S) : Koren et al.

Page 1 of 1

It is certified that error appears in the above-identified patent and that said Letters Patent is hereby corrected as shown below:

On the Title Page

Column 1, Item (71), under "Applicant", delete "Petach Tikva" and insert -- Petah Tikva --, therefor.

Signed and Sealed this  
Twentieth Day of June, 2017

Joseph Matal  
*Performing the Functions and Duties of the*  
*Under Secretary of Commerce for Intellectual Property and*  
*Director of the United States Patent and Trademark Office*